(12) United States Patent
Rau, III

(10) Patent No.: US 9,758,389 B2
(45) Date of Patent: Sep. 12, 2017

(54) SYSTEM FOR SEPARATING CONTAMINANTS FROM FLUIDS

(71) Applicant: Charles B. Rau, III, Gig Harbor, WA (US)

(72) Inventor: Charles B. Rau, III, Gig Harbor, WA (US)

(73) Assignee: Eco Squared Solutions, Inc, Gig Harbor, WA (US)

(*) Notice: Subject to any disclaimer, the term of this patent is extended or adjusted under 35 U.S.C. 154(b) by 406 days.

(21) Appl. No.: 14/665,787

(22) Filed: Mar. 23, 2015

(65) Prior Publication Data

US 2016/0280566 A1 Sep. 29, 2016

(51) Int. Cl.
| | |
|---|---|
| *C02F 1/463* | (2006.01) |
| *B01D 61/18* | (2006.01) |
| *B01D 61/08* | (2006.01) |
| *C02F 1/00* | (2006.01) |
| *C02F 1/44* | (2006.01) |
| *B01D 63/10* | (2006.01) |

(Continued)

(52) U.S. Cl.
CPC .............. *C02F 1/463* (2013.01); *B01D 61/08* (2013.01); *B01D 61/18* (2013.01); *B01D 63/10* (2013.01); *B01D 65/02* (2013.01); *C02F 1/001* (2013.01); *C02F 1/008* (2013.01); *C02F 1/44* (2013.01); *B01D 2321/04* (2013.01); *C02F 1/441* (2013.01); *C02F 1/444* (2013.01); *C02F 1/484* (2013.01); *C02F 2001/46157* (2013.01); *C02F 2001/46171* (2013.01); *C02F 2201/006* (2013.01); *C02F 2201/007* (2013.01); *C02F 2201/008* (2013.01); *C02F 2209/40* (2013.01); *C02F 2303/16* (2013.01); *C02F 2303/26* (2013.01)

(58) Field of Classification Search
CPC .................. C02F 1/463; C02F 1/46104; C02F 2001/46171
See application file for complete search history.

(56) References Cited

U.S. PATENT DOCUMENTS

| | | | |
|---|---|---|---|
| 2,942,733 A | 6/1960 | Thomson | |
| 3,396,846 A | 8/1968 | Hamilton | |

(Continued)

FOREIGN PATENT DOCUMENTS

| | | | |
|---|---|---|---|
| EP | 0050880 A2 | 5/1982 | |
| EP | 0462856 B1 | 10/1991 | |

(Continued)

*Primary Examiner* — Brian W Cohen
(74) *Attorney, Agent, or Firm* — Randall Danskin P.S.

(57) ABSTRACT

A system for separating contaminants from fluids provides a modular mobile continuously operable site configurable multi-phase filtering system having an oil water separator 100, a dwell tank 220, a waste tank 250, an electrocoagulator 120 having plural concentrically aligned perforated tubular sacrificial electrodes, a first and a parallel second particulate filter 300A, 300B, a first and parallel second step-down membrane filter 400A, 400B, an optional ultra filtration filter 500, an optional reverse osmosis filter 600, a mixing station 700 and a totalizer and sensor array 900 to analyze, filter and treat fluids by separating contaminants and particulates and adjusting chemical content to meet specifications desired which will allow the use and re-use of the filtered fluid and the separated contaminants.

19 Claims, 12 Drawing Sheets

(51) Int. Cl.
   *B01D 65/02*   (2006.01)
   *C02F 1/48*   (2006.01)
   *C02F 1/461*   (2006.01)

(56) References Cited

U.S. PATENT DOCUMENTS

| | | |
|---|---|---|
| 3,710,949 A | 1/1973 | Murkes |
| 4,199,451 A | 4/1980 | Hsiung et al. |
| 4,203,849 A | 5/1980 | Ino et al. |
| 4,385,986 A | 5/1983 | Jaisinghani et al. |
| 4,608,160 A | 8/1986 | Zoch |
| 4,782,789 A | 11/1988 | Canzoneri |
| 4,800,025 A | 1/1989 | Bibaeff |
| 4,802,978 A | 2/1989 | Schmit et al. |
| 5,080,802 A | 1/1992 | Cairo, Jr. et al. |
| 5,350,527 A | 9/1994 | Kitko |
| 6,189,613 B1 | 2/2001 | Chachula et al. |
| 7,370,701 B2 | 5/2008 | Surjaatmadja et al. |
| 7,429,332 B2 | 9/2008 | Surjaatmadja et al. |
| 8,211,284 B2 | 7/2012 | Hamid et al. |
| 8,257,588 B2 | 9/2012 | Mori et al. |
| 8,268,051 B2 | 9/2012 | Hess |
| 8,318,023 B2 | 11/2012 | Mordukhovich et al. |
| 8,449,750 B2 | 5/2013 | Hamid et al. |
| 2004/0140218 A1* | 7/2004 | Gavrel ............. B01D 21/0009 204/660 |
| 2004/0244983 A1 | 12/2004 | Appleford et al. |
| 2007/0062853 A1 | 3/2007 | Spani |
| 2008/0041499 A1 | 2/2008 | Grassi et al. |
| 2014/0311960 A1* | 10/2014 | Xia .................... C02F 1/463 210/202 |
| 2015/0251932 A1* | 9/2015 | Laaroussi ............. C02F 1/463 205/701 |
| 2016/0167985 A1* | 6/2016 | Venier ................... C02F 1/463 205/742 |

FOREIGN PATENT DOCUMENTS

| | | |
|---|---|---|
| EP | 2366440 B1 | 8/2012 |
| WO | 2008157547 A1 | 12/2008 |
| WO | 2012089786 A1 | 7/2012 |

* cited by examiner

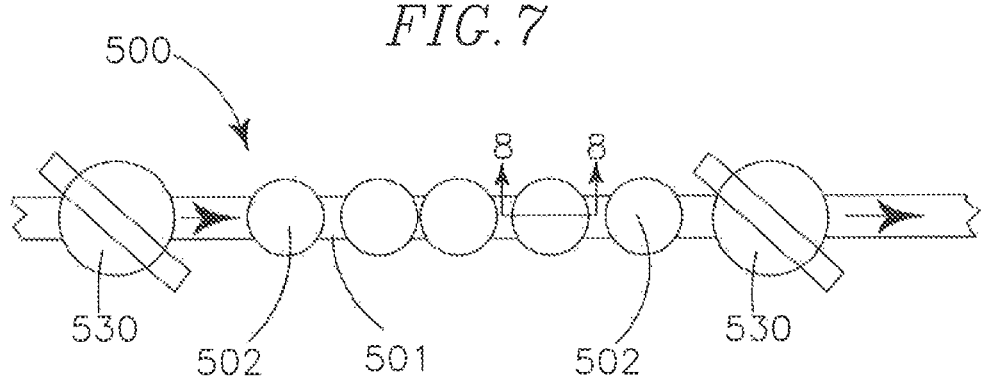
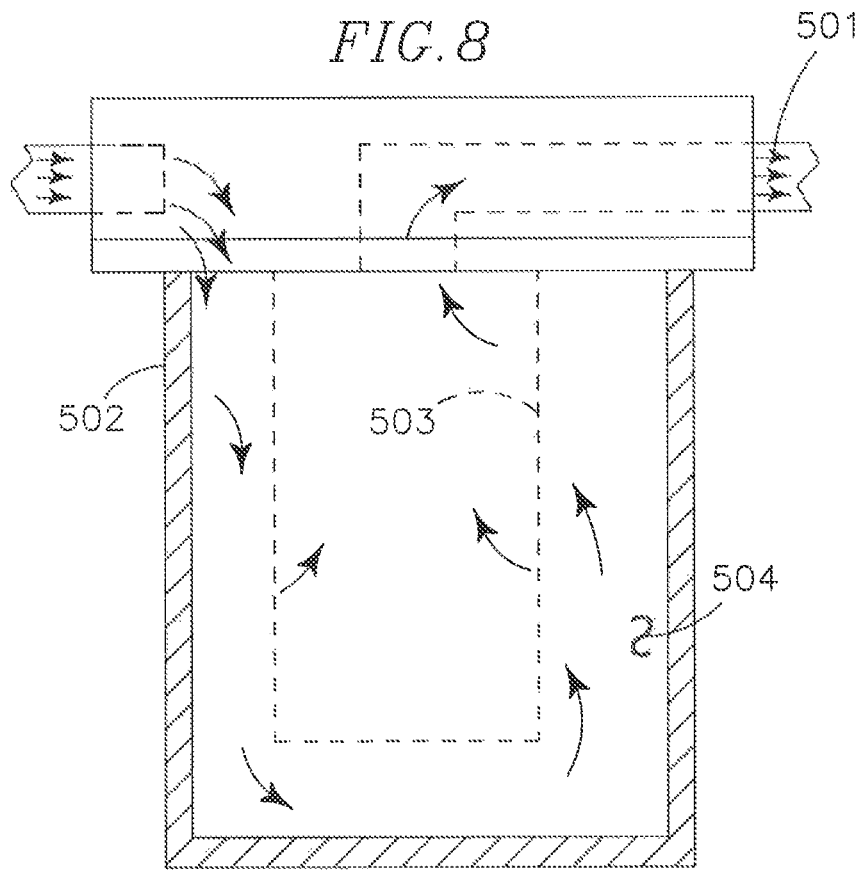

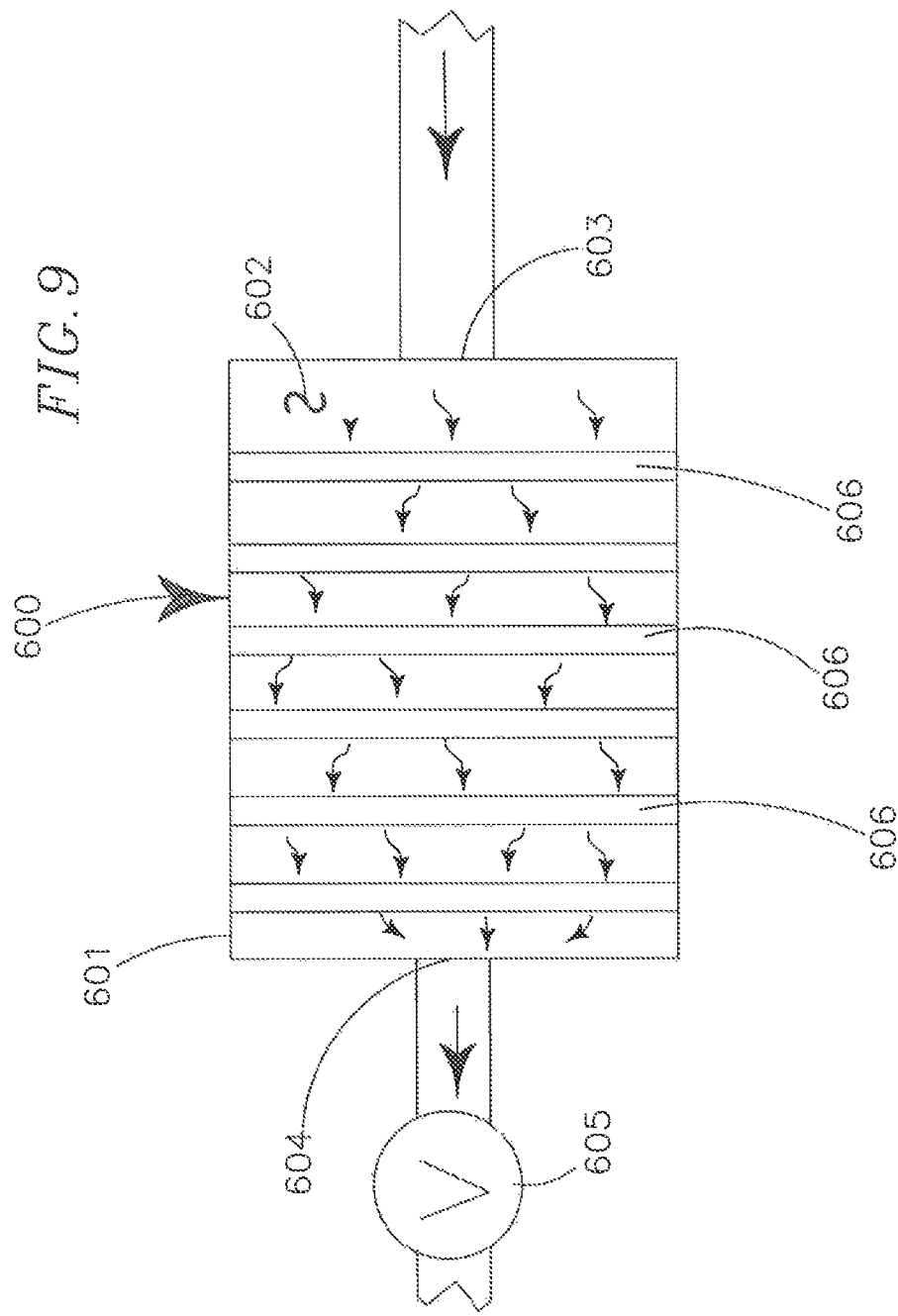

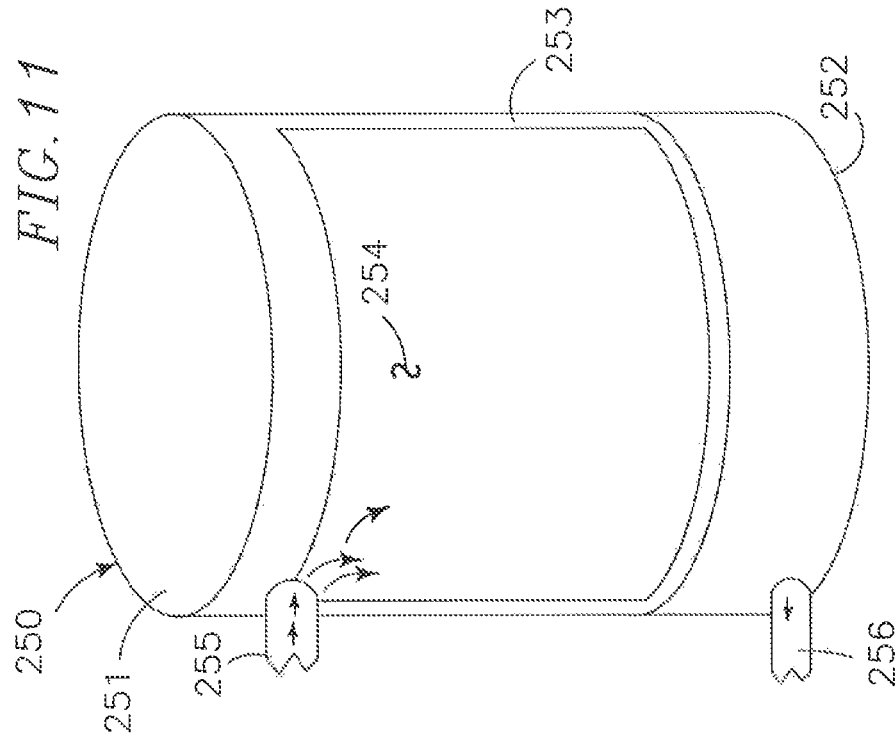
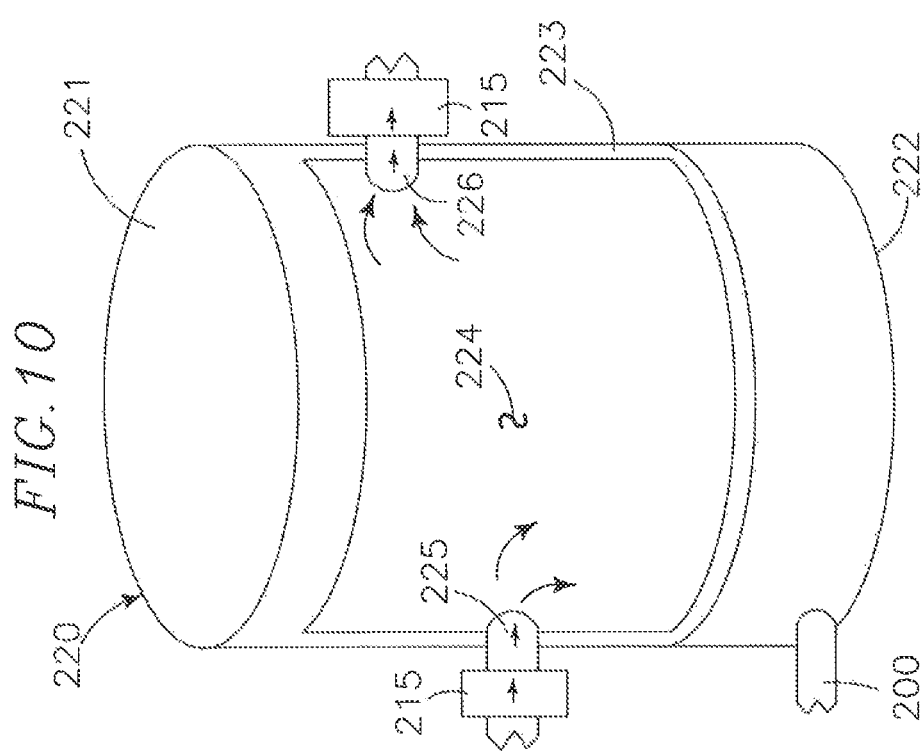

SYSTEM FOR SEPARATING CONTAMINANTS FROM FLUIDS

RELATED APPLICATION

This patent application is a Continuation in Part of, and claims the benefit of earlier filed U.S. Provisional Patent Application No. 61/881,366 filed on Sep. 23, 2013 and titled SYSTEM FOR REMOVING CONTAMINANTS FROM WATER and also claims the benefit of earlier filed PCT Patent Application No. PCT/US14/56624 filed on Sep. 19, 2014 TITLED SYSTEM FOR REMOVING CONTAMINANTS FROM FLUIDS. The entire contents of earlier filed U.S. Provisional Application No. 61/881,366 and earlier filed PCT/US14/56624 are expressly incorporated herein, in their entirety, by this reference.

TECHNICAL FIELD

The present invention relates generally to filtration systems for separating and removing contaminants from fluids.

BACKGROUND ART

Fluid is defined as a continuous, amorphous substance where molecules move freely past one another and that has the tendency to assume the shape of its container. Many substances are fluids including but not limited to water. For purposes of this patent disclosure the fluid is described as being water but it is to be expressly understood the fluids described herein are not limited to water. Water at the molecular level is formed of two Hydrogen (H) atoms bonded to one Oxygen (O) atom. The chemical formula for water is $H^2O$. Water is one of the most abundant substances on Earth and is essential for animal life and plant life. Most life and particularly animal life requires water that is free from contaminants and more particularly free from harmful contaminants. There are a variety of known processes for separating contaminants from water, and such processes may be as simple as a screen filter and as complex as reverse osmosis. Generally it is the type of contaminant that is to be removed from the water, and the subsequent use of the water that dictates the complexity of the process used to remove the contaminants. For example, if human consumption (potable water) is the desired end product, the system/process must remove all harmful contaminants and such systems can be both complex and expensive. Conversely, if the desired end product is water suitable for industrial purposes, the system may not need to be so complex, robust and expensive.

One industrial process that produces large volumes of contaminated fluid as a byproduct is induced hydraulic fracturing. Induced hydraulic fracturing or hydro-fracturing, sometimes termed "fracking", is a technique in which water is mixed with sand and chemicals, and the mixture is injected at high-pressure into a well bore to create small fractures (typically less than 1 mm), along which desirable fluids including gas, petroleum and hydrocarbons may migrate to the well for collection and harvesting.

The hydraulic fractures are created by pumping fracturing fluid into the well bore at a rate sufficient to increase down-hole pressure above the fracture gradient (pressure gradient) of the rock. The rock cracks and the fracturing fluid continues propagating into the rock, extending the crack still further. Introducing a proppant, such as grains of sand, ceramic, or other particulates into the fracturing fluid prevents the fractures from closing upon themselves when the pressure of the fluid is removed.

During the fracturing process, some amount of fracturing fluid is lost through "leak-off" when the fracturing fluid permeates into the surrounding rock. If not adequately controlled, fracturing fluid leak off can exceed 70% of the injected volume. The portion of the fracturing fluid that is not lost through "leak off" returns to the surface through the well and is called "waste water", "flow back water" or "produced water". The waste water may be heavily contaminated.

Hydraulic fracturing equipment usually consists of a slurry blender and one or more high-pressure high-volume fracturing pumps, a monitoring unit and associated equipment including, but not limited to, fracturing fluid tanks, units for the storage and handling of proppant, a variety of testing, metering and flow rate equipment and storage tanks and/or ponds for contaminated waste water. Typically, fracturing equipment operates in high-pressure ranges up to approximately 15,000 psi and at volume rates of approximately 9.4 ft.$^3$ per second. This is approximately 100 barrels fluid per minute at 42 gallons per barrel. (4200 gallons per minute).

The fracturing fluid injected into the well is typically a slurry of water, proppants, poly-coagulants and chemical additives comprising approximately 90% water, approximately 9.5% sand and approximately 0.5% chemical additives. A typical fracturing fluid composition, many of which are proprietary and considered industrial trade secrets, uses between three (3) and twelve (12) chemical additives which may include: acids, sodium chloride, poly acrylamide, ethylene glycol, sodium carbonate, potassium carbonate, flutaraldehyde, guar gum, citric acid and isopropanol. Some portion of the additives maybe charged particulates and/or ionic molecules.

A typical fracturing process requires between approximately two million and five million gallons of water per well. Approximately 10%-40% of the fracturing fluid pumped into the well returns to the surface as wastewater and commonly contains a variety of contaminants including, but not limited to, hydrocarbons, carbon dioxide, hydrogen sulphide, nitrogen, helium, iron, manganese, mercury, arsenic, lead, particulates, chemicals and salts as well as the chemical additives added to the fracturing fluid before injection into the well. Wastewater production commonly averages between approximately 3,000 barrels and 5,000 barrels per day at 42 gallons per barrel. (126,000-210,000 gallons).

The wastewater flowing back to the surface and exiting the well bore is collected and pumped into wastewater storage tanks or into wastewater ponds that are lined with plastic or the like to prevent the wastewater from leaching into the ground. After the fracking operation is complete, the wastewater storage tanks and/or wastewater storage ponds are drained and the wastewater therein is transported to salt water dumps (SWDs) or hazardous waste sites for permanent disposal.

Beginning in 2015, a United States Government Environmental Protection Agency (EPA) regulation will require a "paper-trail" that documents when and where all hydraulic fracturing wastewater originates and where the wastewater is taken for disposal. These new regulations create additional expenses and increase future potential liabilities of drillers and fracking operators.

In the Marcellus Shale deposit of North Dakota USA, it is estimated to cost more than approximately $3 per barrel (42 gallons/158.98 liters) to dispose the wastewater and approximately $7 to $10/per barrel (42 gallons/158.98 liters) to transport wastewater to an approved disposal site. There is also a cost for sweet water (fresh water) needed for conducting the hydraulic fracturing operation. In arid and semi-arid areas fresh water is an additional cost factor. For example the hydraulic fracturing of a horizontal well may use approximately 4.2 million gallons (15.89 million liters) of fresh water which must be purchased and available for the fracking operation.

Fresh water sourcing is becoming a revenue business as some municipalities and landowners in the Western United States are selling water rights to the petroleum drilling industry for hydraulic fracturing.

For example, Texas has small amounts of available fresh water but has the geography to properly dispose of contaminated wastewater. Pennsylvania, on the other hand, has abundant supplies of fresh water but has no place to dispose of wastewater. In the Northeast United States, disposal of wastewater is problematic and as a result wastewater disposal has moved generally West toward Ohio and Indiana and Virginia where the wastewater is being dumped into pits. It is estimated in the near future, wastewater "dumpers" may have to pay as much as approximately $5,000 to $6,000 per truckload in disposal site charges not including the cost of transporting the waste water to the dump site.

There are four primary methods for dealing with hydraulic fracturing wastewater. A first method reuses the untreated wastewater in the hydraulic fracturing process. Unfortunately, reuse is problematic as high levels of contaminants tend to plug the well with "residual chemicals", particulates, or shale fines" which may negatively impact production of the well.

A second method is "deep well injection," which entails drilling a deep disposal well into which the wastewater is pumped for permanent disposal. Deep well injection is problematic as seismologists and the scientific community have alleged earthquakes "were almost certainly induced by the disposal of fracking wastewater in deep disposal wells." The drilling of a disposal well is also expensive and such disposal increases the volume of fresh water required for fracturing operations as the wastewater is not re-used.

A third method is on-site treatment of the wastewater which removes the most harmful chemicals and contaminants from the wastewater. Some portion of the treated water may then be reused in the fracturing. On-site treatment generally has negligible transportation costs, but with known systems and known technology is more expensive than other options due to the high maintenance costs of known systems and the need to repeatedly shut the system down for cleaning and backwashing. Further, such known systems and technology operate under high pressures typically exceeding 250 psi, are readily known for being easily damaged and even destroyed by small amounts of hydrocarbons that may accidentally pass through the system to filter membranes. Such filter membranes have a limited amount of membrane surface area available for filtration, are expensive, and difficult to replace. Further, membrane replacement is a time consuming process during which the system must be shut down.

The fourth method is off-site treatment and disposal of the wastewater. Similar to deep well injection, off site treatment and disposal increases the volume of fresh water required for fracturing operations as the wastewater is not reused or recycled. This fourth option is the most expensive as transportation costs and disposal costs may be enormous.

One industry estimate places the cost of treating wastewater, including costs for equipment, operation, labor, chemicals, and sludge handling, at up to approximately $20 per barrel. Because hydraulic fracturing may produce upwards of 3,000-5,000 barrels (126,000-210,000 gallons, or 476,961-794,936 liters) of wastewater per well, per day, this cost may be as high as $60,000-$100,000 per day.

The huge volume of fresh water necessary for fracturing operations, many of which occur in arid and semiarid areas, is another significant cost that must be recouped. Any ability to reuse or recycle wastewater can offset some portion of the cost. Water, be it the acquisition of fresh water, the handling of the wastewater, and the ultimate disposal of the wastewater is a significant and burdensome cost that is necessarily borne in the cost of the well. Further, because the wastewater may be so contaminated with pollutants, chemicals, salts and the like, the wastewater may be characterized as "hazardous waste" that must be inventoried, tracked, and handled with extreme care prior to, during and after disposal. Further, disposal of "hazardous waste" leads to more hazardous waste sites that permanently damage the environment.

Any means by which wastewater may be filtered or otherwise treated to remove contaminants and allow reuse and/or recycling of the water, or disposal of the water in sites other than "hazardous waste sites" or "saltwater dumps" will reduce the cost of bringing wells into production and will reduce the hazardous byproducts and environmental impacts of hydraulic fracturing operations.

The instant improved contaminant removal system resolves various of these known problems by providing a mobile truck mounted system comprising a combination of known and new filtration and separator technology and salt removal technology for wastewater generated as a byproduct of hydraulic fracturing operations, wastewater from industrial processes and wastewater from agricultural operations, including, but not limited to feedlots.

The instant improved contaminant removal system allows the wastewater to be recycled for re-use by separating and removing contaminants in a series of steps which provides savings by reducing the need for fresh water and reducing costs of transportation to and from fresh water sources, reducing the need to transport wastewater to dump sites, reduction in dump fees and by reducing the amount of wastewater that requires governmental regulated disposal.

The removal of contaminants, including but not limited to solids, oils, BTEX compounds, diesel, benzene, toluene, xylene, ethyl-benzene, distillates, dissolved salts, phosphates, iron, manganese, arsenic, poly-coagulants, fertilizers and animal waste is achieved through use of the instant improved contaminant removal system.

The instant improved contaminant removal system is modular and is carried on trailers allowing the entire system to be mobile. The kilowatt (KW) requirement for the complete system is approximately 500 KW which may be supplied by portable skid mounted generator sets.

The performance of the instant improved contaminant removal system provides for removal of contaminants and recovery of the fluid between approximately 350 gallons per minute (GPM) and approximately 450 GPM.

The instant improved contaminant removal system removes even small amounts of hydrocarbons that destroy Poly-Pan filtration membranes of salt removal systems which are costly to repair, replace and maintain.

The instant improved contaminant removal system uses a novel electrocoagulator system to avoid or at least minimize the need for chemical coagulants and precipitates which increase the number of contaminants to be removed from the fluid and ultimately disposed.

The instant improved contaminant removal system's novel electrocoagulator system is not affected by temperature of the fluids being filtered and as a result can be used in a wider variety of circumstances and conditions and is not dependent upon chemical reactions.

The instant improved contaminant removal system uses a novel electrocoagulator system with plural replaceable concentrically aligned perforated anodes and cathodes that are closely spaced adjacent one another so that the energy requirements for powering electrocoagulation is minimized.

The instant improved contaminant removal system's use of plural concentrically aligned replaceable perforated anodes and cathodes provides a greater surface area for electrocoagulation to occur and the perforation of the anodes and cathodes has negligible affect on the pressure and flow of fluids through the system.

The instant improved contaminant removal system's plural concentrically aligned anodes and cathodes release ions into the fluid, and as the ionic charges of the contaminants is neutralized or reduced by bonding with the released ions, emulsions, colloids and ionically charged particles agglomerate and rise to the surface of the fluid with the microbubbles forming a flocculent on the surface of the fluid which is removed by the swiper blades of the removable top.

The instant improved contaminant removal system's electrocoagulation is not affected by hydrocarbons. Copy removes hydrocarbon emulsions and colloids from the fluid.

Some or all of the problems, difficulties and drawbacks identified above and other problems, difficulties, and drawbacks may be helped or solved by the instant improved contaminant removal system shown and described herein. The instant improved contaminant removal system may also be used to address other problems, difficulties, and drawbacks not set out above or which are only understood or appreciated at a later time. The future may also bring to light currently unknown or unrecognized benefits which may be appreciated, or more fully appreciated, in the future associated with the novel inventions shown and described herein.

BRIEF SUMMARY OF THE INVENTION

An improved system for separating contaminants from fluids provides a modular continuously operable mobile system having an oil-water separator, an electrocoagulator having plural replaceable concentrically aligned perforated anodes and cathodes, a dwell tank, a waste tank, a first particulate filter, a parallel second particulate filter, a first step down membrane filter, a parallel second step down membrane filter, a mixing station, a sensor array and a totalizer. An ultra-filtration system, a reverse osmosis filter and a chemical blender may be optionally added to the system to further contaminant removal.

In providing such an improved system for the separation of contaminants from fluids it is:

a principal object to provide a modular mobile system that is continuously operable even when components are being backwashed.

a further object to provide a modular mobile system that removes hydrocarbons.

a further object to provide a modular mobile system that provides a means for blending treated/filtered fluid with water to attain the desired standards.

a further object to provide a modular mobile system that will process acids and alkaline fluid through pH neutralization and balancing to attain desired standards.

a further object to provide a modular mobile system that provides an adjustable bypass where 100% of the fluid need not pass through the entire system.

a further object to provide a modular mobile system that allows the pH to be adjusted to desired standards to facilitate effective flocculation, coagulation, precipitation and contaminant separation/removal.

a further object to provide a modular mobile system that separates/removes micron size contaminants.

a further object to provide a modular mobile system that provides a variety of sensors and gauges to monitor head pressure, flow rate, flow volume and system performance.

a further object to provide a modular mobile system having parallel filter paths for continuous operation.

a further object to provide a modular mobile system that operates at low-pressure of approximately between 60 PSI and 100 PSI.

a further object to provide a modular mobile system that utilizes magnetic fields and electric fields to exert ionic influences on charged and ionic particulates.

a further object to provide a modular mobile system that uses low pressure membranes to separate contaminants from fluids.

a further object to provide a modular mobile system that uses a "step down" process through plural fluidically interconnected bodies to facilitate continuous operation using membrane filters.

a further object to provide a modular mobile system having an optional ultra filtration manifold using replaceable filter cartridges.

a further object to provide a modular mobile system having an optional chemical blender to modify, buffer and pH balance the fluids.

a further object to provide a modular mobile system having an optional reverse osmosis filter.

a further object to provide a modular mobile system that provides an optional dwell tank to facilitate flocculation, precipitation and settling of contaminants and particulates.

a further object to provide a modular mobile system having a chemical meter for precisely metering additives into the fluids to facilitate and promote flocculation, coagulation, settling and precipitation and contaminant removal.

a further object to provide a modular mobile system that oxygenates fluids.

a further object to provide a modular mobile system that supplies ozone to the fluids.

a further object to provide a modular mobile system having filtration vessels that utilize a variety of filter medias.

a further object to provide a modular mobile system having filtration vessels that utilize crushed glass filter media.

a further object to provide a modular mobile system having filtration vessels that utilize IMA-65® as a filter media.

a further object to provide a modular mobile system that provides for continuous and "on demand" addition of chemicals to enhance and facilitate separation of contaminants and coagulation and precipitation of contaminants.

a further object to provide a modular mobile system having easily replaceable membrane filters.

a further object to provide a modular mobile system having variable membrane filter surface area.

a further object to provide a mobile modular system having an electrocoagulator for removing emulsions, colloids and contaminants.

a further object to provide a mobile modular system having a perforated tubular anode and perforated tubular cathode to supply free ions to fluids, emulsions, colloids, contaminants and particulates passing through between and around the tubular anode and the tubular cathode.

a further object to provide a mobile modular system having plural concentrically axially aligned replaceable cathodes and anodes.

a further object to provide a mobile modular system having an electrocoagulator that operates at between approximately 9 V and 24 V.

a further object to provide a mobile modular system having an electrocoagulator that operates using DC voltage.

a further object to provide a mobile modular system that operates at between approximately 20 amps and 30 amps.

a further object to provide a mobile modular system wherein spacing between the anode and the cathode is approximately between 5 mm and 30 mm.

a further object to provide a mobile modular system wherein the polarity of the current to the anode and cathode is reversed repeatedly and rapidly.

a further object to provide a mobile modular system having an electrocoagulator that generates free ions from sacrificial electrodes that are released into the fluid to bond with charged particles to improve separation of contaminants from the fluid.

a further object to provide a mobile modular system having an electrocoagulator wherein microbubbles are generated in the fluid below the anode and cathode to cause agglomerated contaminants to rise to the surface of the fluid.

a further object to provide a mobile modular system having an electrocoagulator that reduces the need for chemical coagulants and precipitates and chemical reactions for contaminant removal.

a further object to provide a mobile modular system that employs a filtration system is not affected by temperature of the fluid.

a further object to provide a mobile modular system having an electrocoagulator with movable swiper blades on an underside surface of a removable lid to remove flocculent foam and the like rising to the surface of the fluid.

a still further object to provide a modular mobile system that provides a means to heat the fluid.

Other and further objects of the instant improved system for separating contaminants from fluids will appear from the following specification and accompanying drawings which form a part hereof. In carrying out the objects of the invention it is to be understood that its structures and features and steps are susceptible to change in design and arrangement and order with only one preferred and practical embodiment of the best known mode being illustrated in the accompanying drawings and specified as is required.

BRIEF DESCRIPTION OF THE DRAWINGS

Preferred forms, configurations, embodiments and/or diagrams relating to and helping to describe preferred aspects and versions of my invention are explained and characterized herein, often with reference to the accompanying drawings. The drawings and features shown herein also serve as part of the disclosure of the invention, whether described in text or merely by graphical disclosure alone. The drawings are briefly described below.

FIG. 7 is an orthographic plan view of an optional ultra-filtration manifold carrying plural screw on filter cartridges.

FIG. 8 is an orthographic partial cross section view of an ultra filtration canister carrying a paper filter cartridge therein taken on line 8-8 of FIG. 7.

FIG. 9 is an orthographic cross section view of an optional reverse osmosis filter.

FIG. 10 is an orthographic partial cutaway side view of a dwell tank with arrows showing the direction of fluid flow therethrough.

FIG. 11 is an orthographic partial cutaway side view of a waste tank.

DETAILED WRITTEN DESCRIPTION

Introduction Notes

Figure 1:
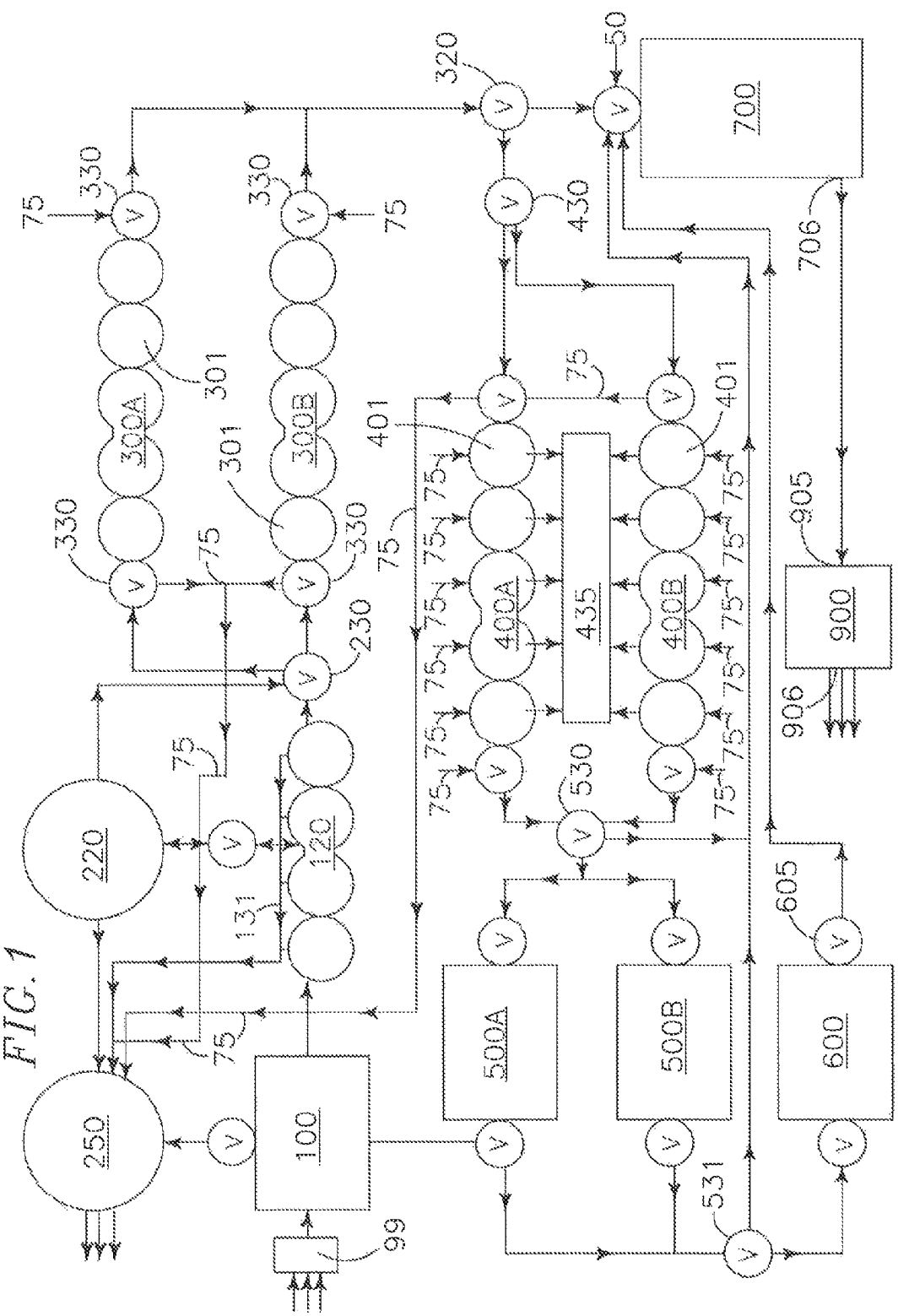
FIG. 1 is a block diagram of the instant improved system for separating contaminants from fluids showing the relationship of the various components with fluid flow indicated by arrows.

The readers of this document should understand that dictionaries were used in the preparation of this document. Widely known and used in the preparation hereof are *The American Heritage Dictionary*, (4th Edition © 2000), *Webster's New International Dictionary*, Unabridged, (Second Edition © 1957), *Webster's Third New International Dictionary*, (© 1993), *The Oxford English Dictionary* (Second Edition © 1989), and *The New Century Dictionary*, (© 2001-2005), all of which are hereby incorporated by this reference for interpretation of terms used herein, and for application and use of words defined in such references to more adequately or aptly describe various features, aspects and concepts shown or otherwise described herein using words having meanings applicable to such features, aspects and concepts.

This document is premised upon using one or more terms with one embodiment that may also apply to other embodiments for similar structures, functions, features and aspects of the inventions. Wording used in the claims is also descriptive of the inventions, and the text of both the claims and the abstract are incorporated by this reference into the description entirely.

The readers of this document should further understand that the embodiments described herein may rely on terminology and features used in any section or embodiment shown in this document and other terms readily apparent from the drawings and language common or proper therefore. This document is premised upon using one or more terms or features shown in one embodiment that may also apply to or be combined with other embodiments for similar structures, functions, features and aspects of the inventions and provide additional embodiments of the inventions.

As used herein, the term "bottom" and its grammatical equivalents means that portion of the improved system for removing contaminants from fluids, or a component thereof, that is closest to a supporting ground surface. The term "top" and its grammatical equivalents means that portion of the Instant improved system for removing contaminants from fluid, or a component thereof, that is vertically distal from the supporting ground surface.

An improved system for separating contaminants from fluids generally provides a modular mobile continuously operable multistage system having an oil water separator 100, an electrocoagulator 120, a dwell tank 220, a waste tank 250, a particulate filter 300, a step down membrane filter 400, a mixing station 700 and a totalizer 900. Optionally, the improved system for system contaminants from fluids may also provide an ultra filtration system 500, a reverse osmosis filter 600 and a chemical blender 800.

In a most simple description, the instant improved system takes contaminated fluid, such as but not limited to waste water from induced hydraulic fracturing operations and/or waste water from agricultural operations, and/or juice from fruit/vegetable pulping as an Input, separates contaminants from the fluid through multiple stages of coagulation, precipitation and filtering and produces as an output, a fluid that is reusable, and separated concentrated contaminants that are graduated by particle site. The improved system is economical, continuously operable, is modular and is mobile.

Figure 2:
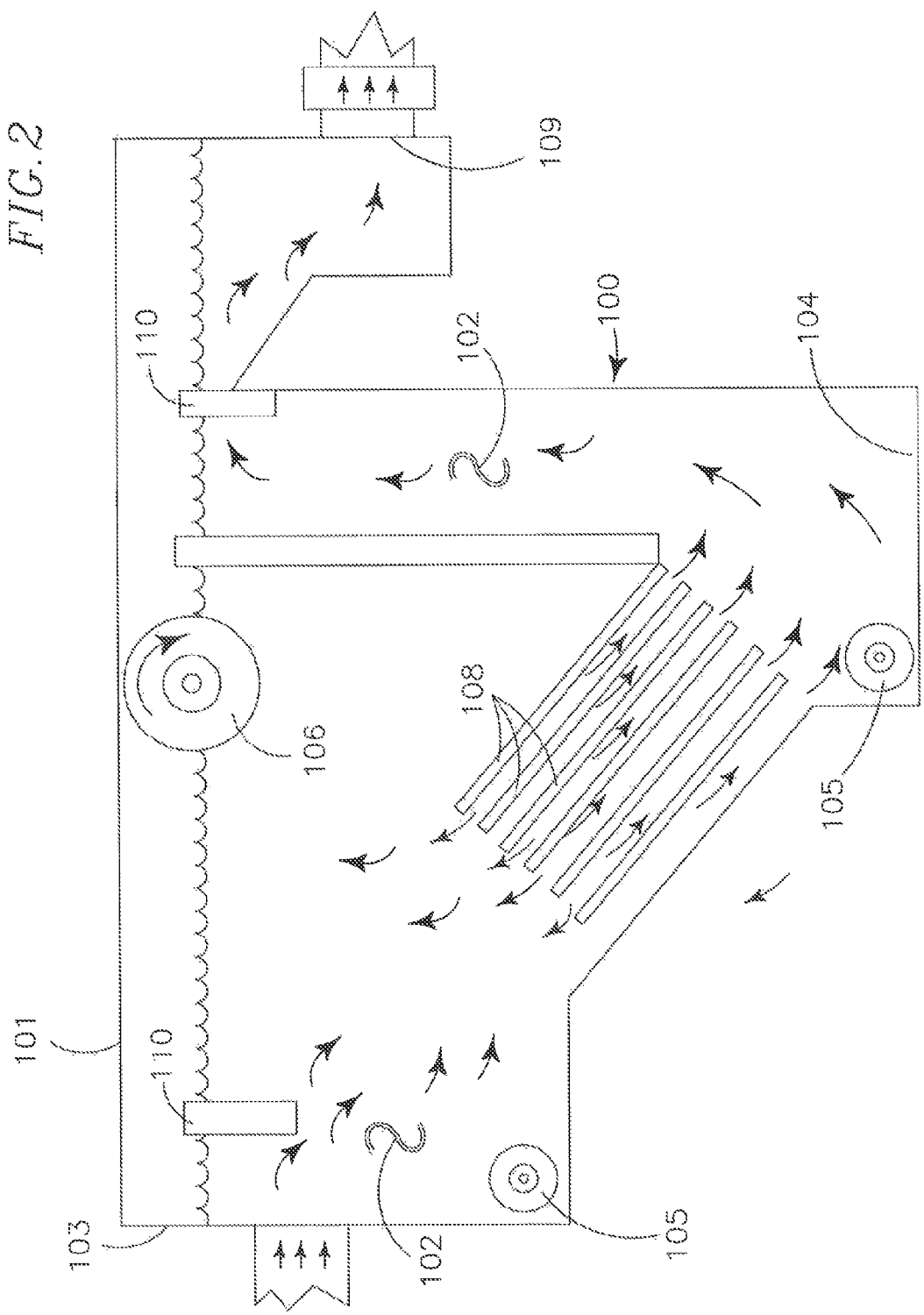
FIG. 2 is an orthographic cross section of an oil water separator with arrows showing the direction of fluid flow therethrough.

The oil-water separator 100, which may be a vertical tube coalescing filter, or a gravimetric API filter, or a parallel plate separator operating on the principals of specific gravity and Stokes Law is similar to an oil-water separator manufactured by Oil Water Separator Technologies, LLC of Florida USA. In the preferred embodiment the oil-water separator 100 is a parallel plate separator. The oil-water separator 100 (FIG. 2) comprises a body 101 defining an interior volume 102 carrying plural parallel angulated separator plates 108 therein. The body 101 defines a fluid inlet 103 at a one end portion through which contaminated fluid enters the volume 102. A sludge catch basin 104 is within the volume 102 proximate a bottom portion of the body 101. Sludge drains 105 defined in the body 101 provide a means for removing sludge and the like from the volume 102. A rotary skimmer 106 is carried within the volume 102 proximate a top portion and spaced apart from the fluid input 103. The rotary skimmer 106 rotates on an elongate axis and removes contaminants agglomerating on an upper surface of fluid within the volume 102. The plural parallel angulated plates 108 are carried within the volume 102 spacedly below the rotary skimmer 106. Contaminants such as oil agglomerate on bottom surfaces of the plural parallel angulated plates 108. As the agglomerations of oil become larger, the agglomerations tend to move upwardly along the bottom surface of the plural parallel angulated separator plates 108 and ultimately "float free" from the plural parallel angulated separator plates 108 to rise to the surface of the fluid within the volume 102 to be removed by the rotary skimmer 106. Sediments within the fluid fall onto top surfaces of the plural parallel angulated separator plates 108 and collect in the sludge basin 104. Adjustable weir plates 110 allow the fluid levels to be adjusted as needed to promote contaminant removal. A fluid outflow 109 is defined in the body 101 distal from the fluid input 103. Although known oil-water separators 100 are effective at removing droplets and globules of oil from fluids such as water, known oil-water separators 100 are recognized as not being effective at removing emulsified oil or colloids.

In the preferred embodiment, the oil-water separator 100 is trailer mounted and is mobile. The oil water separator 100 fluidically and electrically interconnects with the other components of the system by known plumbing and electrical interconnections and apparatus. From the oil water separator 100 the fluid flows through the fluid outflow 109 to the electrocoagulator 120.

The electrocoagulator 120 (FIGS. 3, 12-15) is formed of plural bodies 121, each body 121 fluidically interconnected to a spacedly adjacent body 121 by known plumbing apparatus and fittings. In the preferred embodiment, each electrocoagulator body 121 is an approximately sixty inch (152.4 cm) diameter "vertical barrel type" filter canister such as those made by Yardney®, Inc. of California USA.

Each body 121 has a top portion 122, a bottom portion 123, a side portion 124, a height 125 extending from the top portion 122 to the bottom portion 123 and defines an interior volume 126. An inflow port 127 defined in the side portion 124 communicates with the interior volume 126 and allows fluids from the oil-water separator 100 to flow into the volume 126. A deflector plate (not shown) may be carried within the interior volume 126 aligned with and spaced apart from the inflow port 127 to "disburse" and "distribute" fluids flowing into the volume 126 upwardly, downwardly, laterally and angularly to prevent concentrated inflow of fluid at a single level within the volume 126 to enhance functionality of the electrocoagulator 120 and prevent concentrated localized wear on the anodes 150 and cathodes 160. An outflow port 128 is defined in the side portion 124 of each body 121 preferably at a position vertically below the inflow port 127. A chemical input port 209 communicating with the volume 126 is defined in each body 121. A flocculent outlet 131 communicating with the volume 126 is defined in the body 121 proximate the top portion 122 to allow flocculent, foam, floating debris, and the like (not shown) to be removed from the volume 126. A chemical additives meter 214 communicates with the chemical input port 209 to add/meter into the interior volume 126 precise amounts of chemical additives, such as but not limited to, pH buffers, acids, bases, flocculants, poly-coagulants and the like which may enhance flocculation, coagulation and precipitation of contaminants within the fluid if such chemical additives are required.

A dielectric insulator 132 is carried within the volume 126 on an interior bottom 123 of each body 121 to electrically insulate anode 150 and cathode 160 carried within the volume 126. The insulator 132 may define grooves (not shown), ridges (not shown) or other known alignment apparatus to assist in alignment and positioning of the anode 150 and the cathode 160. Spacing 170 between the anode 150 and cathode 160 is critical and has a direct affect on system operation.

The anode 150 is tubular in configuration having a body 151, a top portion 152, a bottom portion 153, a side portion 155, a height 154 extending from the top portion 152 to the bottom portion 153, an interior diameter 156, an exterior diameter 174 and defines a plurality of spacedly arrayed perforations 157 in the side portion 155 extending from the bottom portion 153 to the top portion 152. In the preferred embodiment the anode 150 is formed of steel, and more particularly A-53 steel because of its material characteristics, molecular characteristics, performance, formability, cost and availability, although it is expressly contemplated herein that other materials my likewise be used for the anode 150. The perforations 157 defined in the side portion 155 of the anode 150 may vary in size/diameter, but in the preferred embodiment each perforation 157 is preferably between 1/32 inch and 3/4 inch in diameter to allow free flow of fluids therethrough while still retaining sufficient surface area to for electrocoagulation to efficiently occur.

Lifting loops 158 are carried at the top portion 152 of the anode 150 to facilitate removal and installation of the anode 150 within the electrocoagulator body 121. An electrical connection 159 is likewise structurally interconnected to the anode 150 at a convenient location, such as proximate the top portion 152 to provide electrical power to the anode 150. It is contemplated the lifting loops 158 may also function as the electrical connection 159.

The cathode 160 is similar in construction and configuration to the anode 150. The cathode 160 is tubular in configuration having a body 161, a top portion 162, a bottom portion 163, a side portion 165, a height 164 extending from the top portion 162 to the bottom portion 163, an interior diameter 166, an exterior diameter 175 and defines a plurality of spacedly arrayed perforations 167 in the side portion 165 extending from the bottom portion 163 to the top portion 162. In the preferred embodiment the cathode 160 is formed of steel, and more particularly A-53 steel because of its material characteristics, molecular characteristics, performance, formability, cost and availability, although it is expressly contemplated herein that other materials my likewise be used for the cathode 160. The perforations 167 defined in the side portion 165 of the cathode 160 may vary in size/diameter, but in the preferred embodiment each perforation 167 is preferably between 1/32 inch and 3/4 inch in diameter to allow free flow of fluids therethrough while still retaining sufficient surface area to for electrocoagulation to efficiently occur.

Lifting loops 168 are carried at the top portion 162 of the cathode 160 to facilitate removal and installation of the cathode 160 within the electrocoagulator body 121. An electrical connection 169 is likewise structurally interconnected to the cathode 160 at a convenient location, such as proximate the top portion 162 to provide electrical power to the cathode 160. It is envisioned the lifting loops 168 may also function as the electrical connection 169

The electrocoagulator 120 uses pairs of anodes 150 and cathodes 160 (collectively "electrodes") and in the preferred embodiment the electrocoagulator 120 uses plural pairs of anodes 150 and cathodes 160 that are axially and concentrically aligned with one another within the volume 126.

Space 170 between the anode 150 and its paired cathode 160 is preferably between approximately six (6) mm and twenty-five (25) mm. This close proximity of the anode 150 to the cathode 160 allows for low power requirement, such as approximately 15-35 Amps and 9-24 Volts which is significantly less than the power requirements for known electrocoagular systems which require large voltages and significant amperages which increases cost of operation. Each anode 150 and cathode 160 pair is independently interconnected to a direct current power source (not shown) which may be, but is not limited to a generator (not shown), a battery pack (not shown). As electrical power is supplied to the anode 150 and cathode 160 the positive side undergoes anodic reactions while the negative side undergoes cathodic reactions. The anode 150 and the cathode 160 are both sacrificial electrodes and both produce ions which are released into the fluid. The released ions react with and neutralize charges of particles within the fluid and thereby initiate coagulation of the particles. The released ions remove undesirable contaminants by chemical reaction and precipitation and by causing colloidal materials to coalesce which float to the surface of the fluid with the assistance of the microbubbles rising through the fluid from the diffuser plate 129. As the fluid containing the contaminants moves through and between the plural anodes 150 and plural cathodes 160 which are generating electric fields within the fluid, there is ionization, electrolysis, hydrolysis and free radical formation which alters the physical and chemical properties of the fluid and the contaminants. The reactive and excited state of the fluid and its molecules causes the contaminants (emulsions, colloids, and such) to be released from the fluid and made less soluble and therefore removable.

It is generally accepted that coagulation is brought about primarily by the reduction of the net surface charge to a point where colloidal particles, which were previously stabilized by electrostatic repulsion, can approach close enough for Van der Waals forces to hold the particles together and allow agglomeration. The reduction of the surface charge is a consequence of the decrease of the repulsive potential of the electrical double layer by the presence of an electrolyte having an opposite charge. The coagulant is generated by electrolytic oxidation of the anode 150.

The electrocoagulated flocculent (not shown) that rises to the surface of the fluid within the volume 126 is dramatically different from chemically coagulated flocculent (not shown) because the electrocoagulated flocculent contains significantly less water, is resistant to sheer forces and is more readily filterable. The result is a more efficient system, more concentrated contaminants and more water is filtered for reuse which reduces the amount of fluid that must be disposed of.

The anode 150 and cathode 160 are carried within the volume 126 defined by each body 121 in close proximity to one another and are preferably installed in multiple concentric pairs. The number of pairs of anodes 150 and cathode 160 installed in a body 121 is to be determined by the user and is dependent upon the characteristics and contaminants of the fluid to be filtered.

Figure 3:
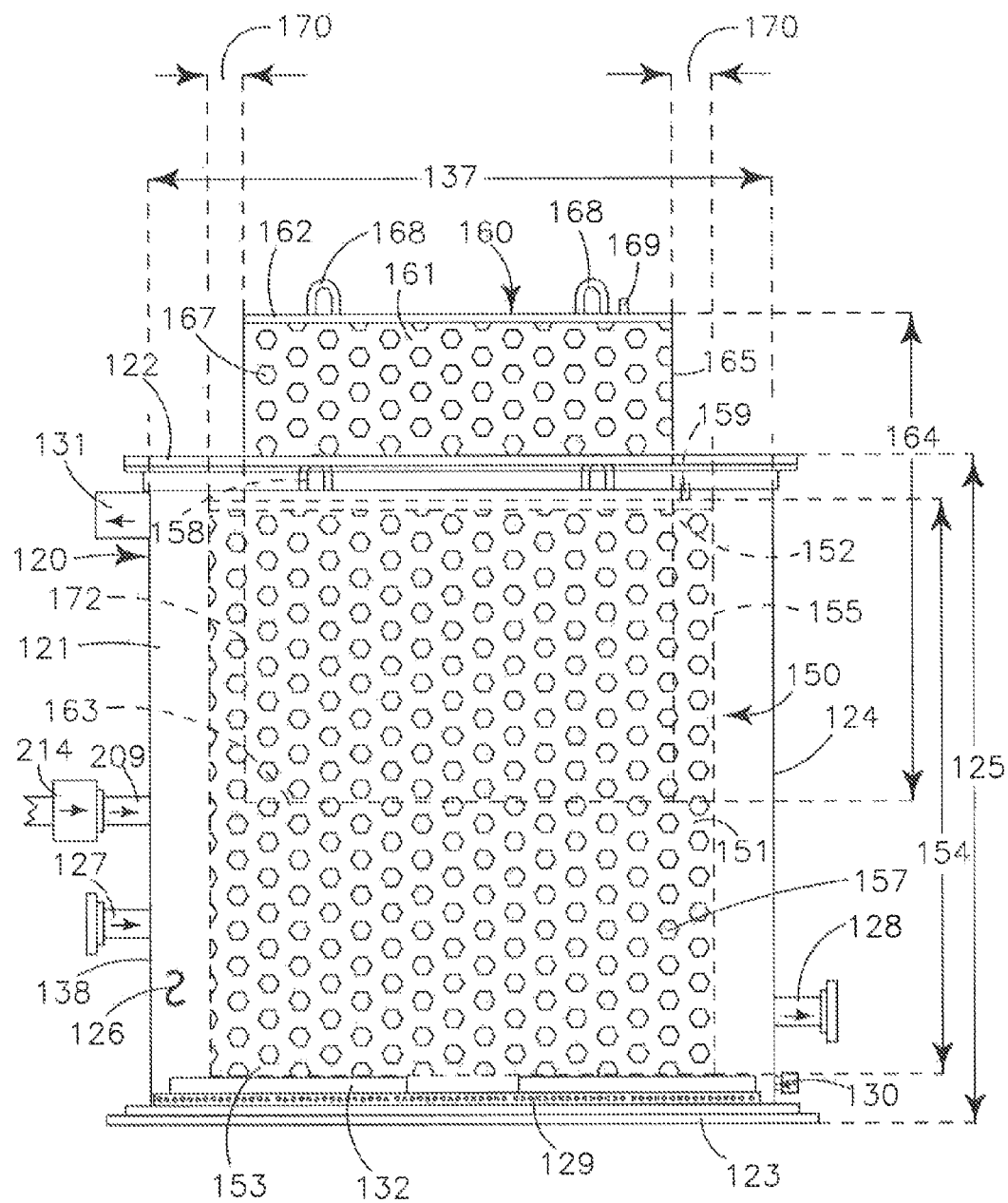
FIG. 3 is an orthographic partial cutaway side view of one electrocoagulator body showing a tubular cathode being lowered in to the volume defined by the electrocoagulator body and also into an interior of a previously installed tubular anode.

As shown in FIG. 3, the anodes 150 and cathodes 160 are installed into the body 121 by lowering the anodes 150 and cathodes 160 into the volume 126 through an orifice defined by the top portion 122. Insulator 132 carried on interior bottom 123 of the body 121 prevents the anode 150 and cathode 160 from directly contacting the body 121 and due to the insulator's 132 diaelectric properties prevents any electrical conductivity therebetween. As noted previously, the insulator 132 may carry grooves (not shown), ridges (not shown) or other known alignment means to properly space the bottom portions 153, 163 of the anode 150 and cathode 160 from one another and preventing any direct contact which would cause an electrical short.

Electrical leads (not shown) pass through and into the body 121 preferably proximate to the flocculate outlet 131 to interconnect with the anodes 150 and cathodes 160 within the volume 126 when the lid 134 is installed. The electrical leads (not shown) are positional so as to not interfere with the movement of swiper blades 140

Lid 134 (FIGS. 14, 15) is removably attached to body 121 and is configured and sized to provide a fluid tight seal with the upper portion 122 of the body 121. The lid 134 has a top portion 135, a bottom portion 136, a diameter 137 and a circumferential edge 138. Lifting loops 143 on the top 135 of the lid 134 provide a means for easily removing, maneuvering and installing the lid 134.

Motor and reduction gearbox 142 are carried on the top portion 135 of the lid 134. Motor 142 has an axle 141 that extends through a medial hole (not shown) defined in the lid 134 extending between the top 135 and the bottom 136. A hub 139 carried on an end portion of the axle 141 opposite the motor and reduction gear box 142 is within the volume 126 of the body 121 when the lid 134 is installed. Swiper blades 140 are carried by the hub 139 and extend curvilinearly radially outwardly from the hub 139 (FIG. 14) and have a diameter 145 that is only slightly less than interior diameter 137 of body 121 so that nearly the entire surface of the fluid within the volume 126 is "swept". The swiper blades 140 move as the hub 139 and axle 141 are rotated by motor and reduction gearbox 142. The swiper blades 140 move similar to the arms of a clock across and along the surface of the fluid within the volume 126. The swiper blades 140 move flocculent, contaminants, foam and the like that has floated/risen to the surface of the fluid into the flocculent outlet 131 defined in the body 121. Contaminants "swept" off the fluid surface and out through the flocculent outlet 131 are passed to the waste tank 250. It is expressly contemplated that during operation of the electrocoagulator 120, the polarity of the electrical current supplied to the anodes 150 and cathodes 160 may be reversed, repeatedly and rapidly to create eddy currents within the fluid and to more effectively "drive" ionic molecules into the fluid and prolong the life of the anodes 150 and cathodes 160. Because the anodes 150 and cathodes 160 are sacrificial, they deteriorate over time and usage due to oxidation and reduction. The removable lid 134 allows the anodes 150 and cathodes 160 to be removed from the bodies 121 and replaced as necessary.

Chemical additive meter 214 is available to automatically or manually add various types of coagulants and/or other chemical additives to the fluid within the electrocoagulator 120 if desired/required, although it is anticipated the electrocoagulation will not require chemical coagulants.

A diffuser plate 129 defining a plurality holes therein is carried within the interior volume 126. An air/ozone input port 130 is defined in the body 121 and communicates with the diffuser plate, to allow air and/or ozone to be injected into the interior volume 126 creating a volume of bubbles and/or "microbubbles" to "bubble up" through the diffuser plate 129 and through the fluid within the interior volume 126 to enhance coagulation and precipitation and oxidation of contaminants and to cause contaminants to float to the surface. The addition of ozone to the fluid within the interior volume 126 provides the added benefit of rapidly oxidizing a variety of chemicals and contaminants and also killing various bacteria, algae and molds that may be present in the contaminated fluid. The use of ozone reduces the need for adding biocides and similar chemicals to kill plants and organisms within the fluid. Although the figures show the diffuser plate 129 proximate the Interior bottom 123 of the body 121 it is expressly contemplated the diffuser plate 129 on plural diffuser plates 129 may be positional within the volume 126 as desired by the user.

Figure 13:
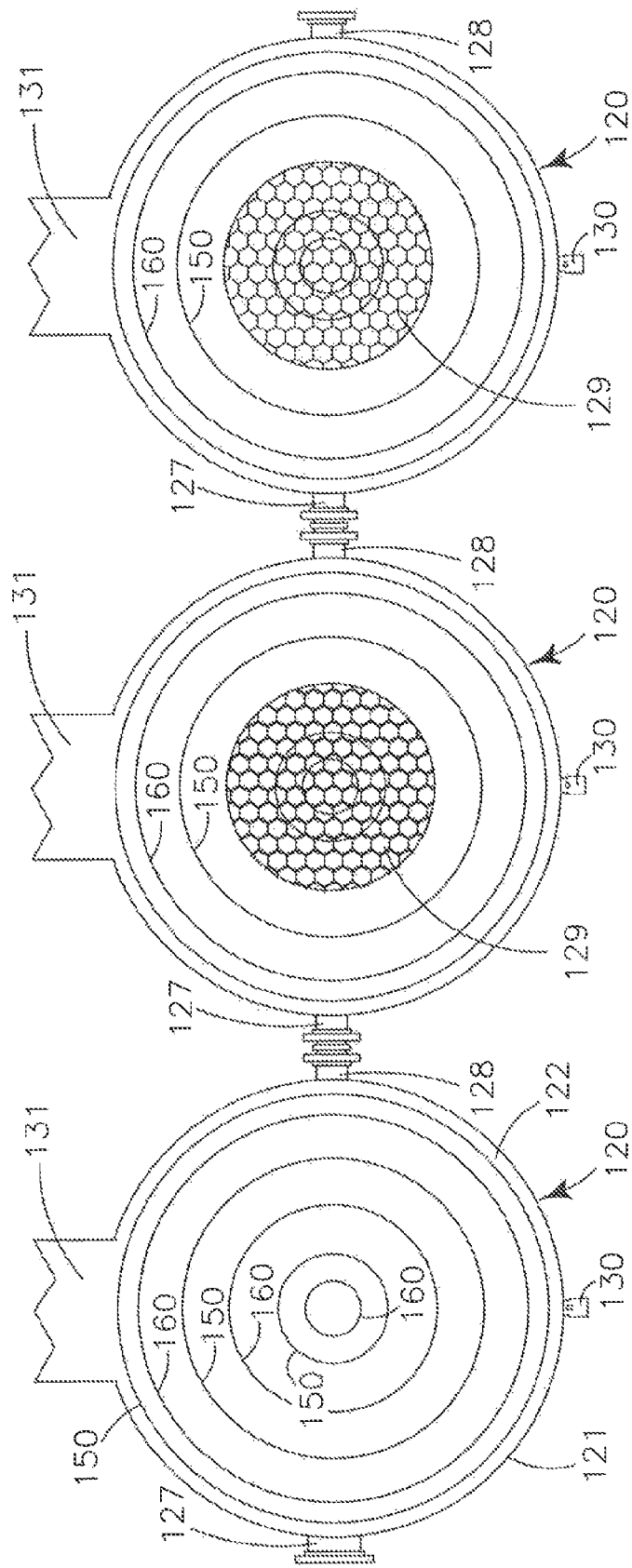
FIG. 13 is a plan view of plural electrocoagulator bodies fluidically interconnected to one another.
Figure 15:
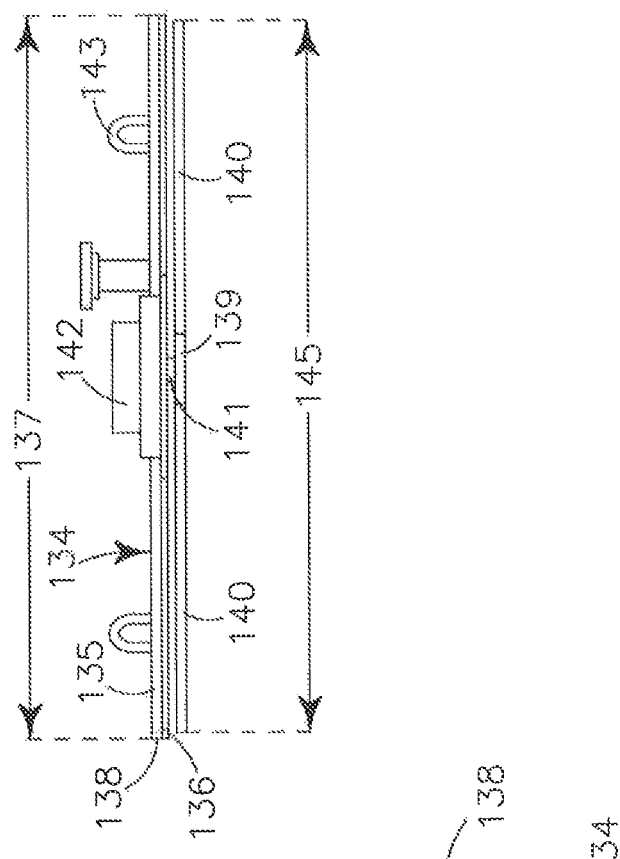
FIG. 15 is an orthographic side view of the electrocoagulator lid of FIG. 14.
Figure 14:
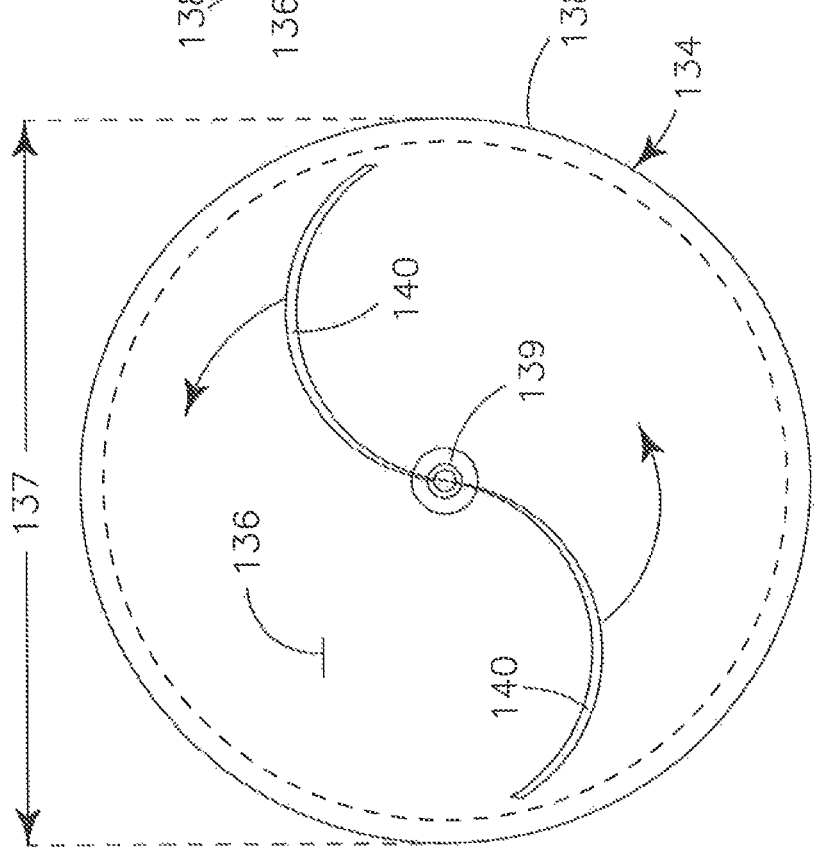
FIG. 14 is an orthographic bottom upward looking view of an electrocoagulator lid showing the swiper blade assembly.

A pump 215 communicates with plumbing means to move fluid into and out of the interior volume 126 of each body 121. As shown in FIGS. 1 and 13, plural bodies 121 are interconnected to provide an efficient electrocoagulator 120 system that provides adequate time for free ions to be released from the sacrificial electrodes 150, 160 to react with charged molecules, particulates, emulsions, molecules and the like in the fluid.

An optional dwell tank 220 (FIG. 10) fluidically communicates with the electrocoagulator 120 and provides a fluid buffer for fluid levels to be maintained as flocculant and some of the fluid is lost in the electrocoagulation process. The dwell tank 220 is preferably a generally cylindrical and mobile tank having a top 221, a bottom 222, a side portion 223 extending from the top 221 to the bottom 222 and defines an interior volume 224. Inflow port 225 is defined in the dwell tank 220 spacedly between the top 221 and the bottom 222. An outflow port 226 is defined in the side portion 223 preferably at a position vertically above the inflow port 225 so that any precipitates and solids "falling out" or otherwise precipitating in the fluid column within the interior volume 224 may settle to the bottom 222 and not flow outwardly from the interior volume 224 when the fluid is removed from the dwell tank 220. The fluid within the dwell tank 220 is moved into the dwell tank 220, and out of the dwell tank 220, by means of pump 215 and valves communicating with known plumbing means.

A waste tank 250 (FIG. 11) has a top 251, a bottom 252, a side portion 253 extending from the top 251 to the bottom 252 and defines an interior volume 254. An inflow port 255 communicates with the interior volume 254 and provides an access through which waste, flocculent foam, sludge and the like may be deposited in the waste tank 250 interior volume 254. An outflow port 256 is defined in the waste tank 250 proximate the bottom 252 and provides a means for draining, or otherwise removing waste from within the interior volume 254. The waste tank 250 fluidically communicates with the oil-water separator 100, with the electrocoagulator 120, with the dwell tank 220 by means of known plumbing interconnections and pumps and valves. The waste tank 250 provides a completely enclosed and secure location for storage of hazardous chemicals and waste products filtered out of the fluid passing through the instant system for removing contaminants from fluids. It is anticipated waste collected within the waste tank 250 depending upon its makeup/composition will be sold as a commodity or transported, on an as needed basis, to a hazardous waste site, or other approved disposal site for waste chemicals. The waste tank 250, because it defines a completely enclosed volume 204 prevents evaporation and volatization of chemicals and additives therein and also protects the environment, wildlife and surroundings.

The outflow port 128 defined in the electrocoagulator 120, and the outflow port 226 defined in the dwell tank 220 each communicate with a selector valve 230 for directing the fluid from the electrocoagulator 120 to the particulate filter 300 and fluid from the dwell tank 220 to the particulate filter 300.

Figure 4:
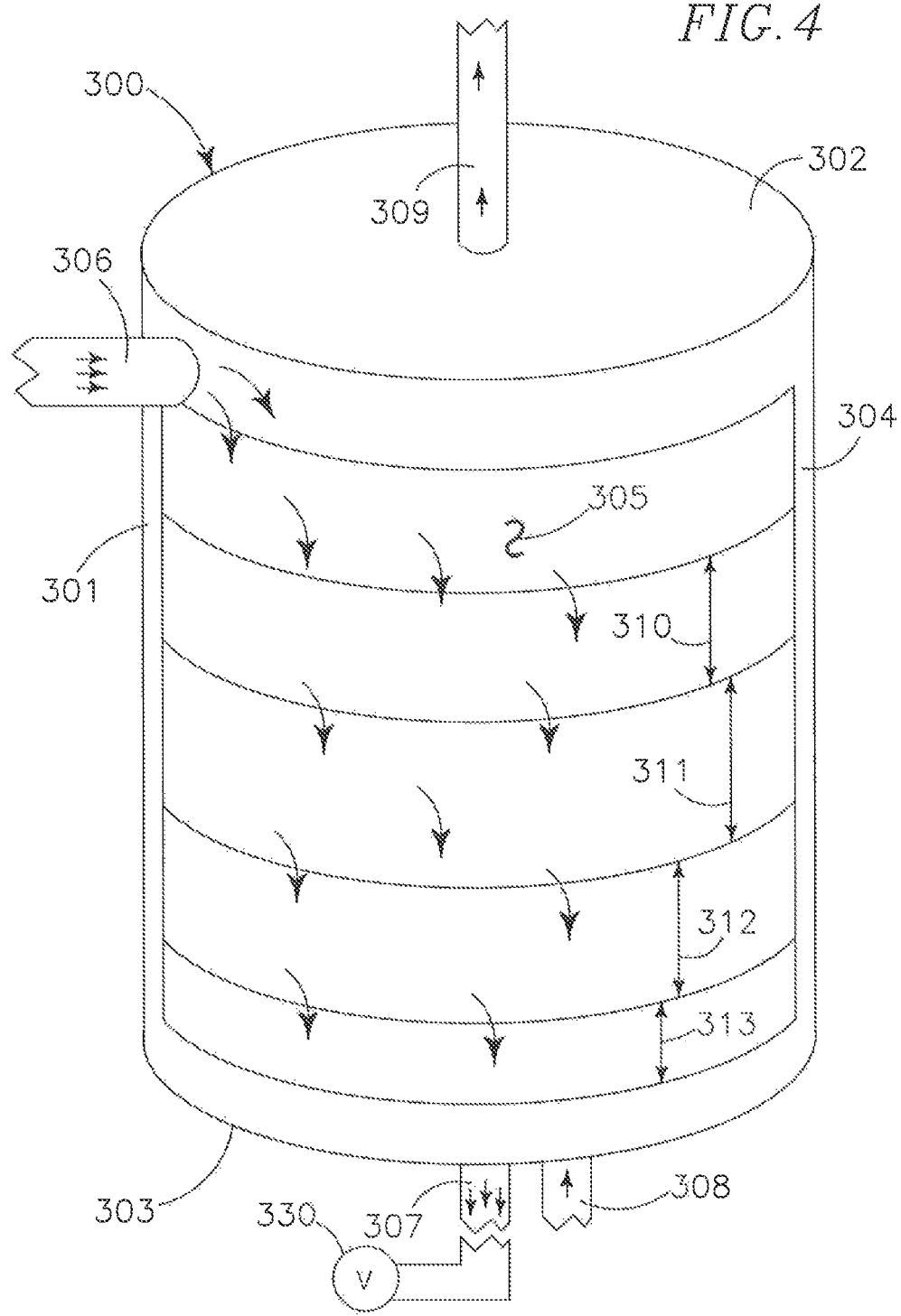
FIG. 4 is an orthographic partial cutaway side view of one particulate filter showing the filter medias therein with arrows showing the direction of fluid flow therethrough.

The particulate filter 300 (FIGS. 1 and 4) has two parallel filter assemblies which are herein referred to as a first particulate filter 300A and a parallel second particulate filter 300B. Fluids to be filtered may flow through either the first particulate filter 300A, or through the parallel second particulate filter 300B or through both particulate filters 300A, 300B by operation valve 230. Because the particular filters 300A, 300B are similar to one another, only the first particulate filter 300A will be described in detail herein.

The particular filter 300 comprises plural fluidically interconnected filter bodies 301, each having a top 302, a bottom 303 and a side portion 304 extending from the top 302 to the bottom 303. Each body 301 defines an interior volume 305.

In the preferred embodiment, each body 301 is an approximately sixty inch (152.4 cm) diameter "vertical barrel type" filter canister such as those made by Yardney®, Inc. of California USA. The bodies 301 are fluidically interconnected with one another by known plumbing apparatus and connections.

Each body 301 (FIG. 4) defines an inflow port 306 and a spaced apart outflow port 307. The interior volume 305 of each filter body 301 contains plural filter medias preferably a first filter media 310, a second filter media 311, a third filter media 312, and a fourth filter media 313. Each filter media 310, 311, 312, 313 is particulated and the particulates have different sizes and different weights so that the filter medias 310, 311, 312, 313 vertically stack automatically—by gravity due to weight—and will generally "re-stack" automatically subsequent to any backwash cleaning process.

The first filter media 310 is preferably particulated small diameter anthracite coal and the particulates thereof form a first upper most layer within the filter body 301 and is between approximately 3 inches (7.5 cm) in depth and 18 inches (46 cm) in depth. The anthracite coal particles preferably have a particle size of approximately between 0.5 mm to 1.15 mm in diameter.

The second filter media 311 positioned vertically below the first media 310 is preferably particulated garnet and the particulates are preferably approximately 0.25 mm to 0.5 mm in diameter. Because the particulated garnet is heavier than the anthracite coal it creates a "medial" layer within the filter body 301 and is between approximately 3 inches (7.5 cm) in depth and 18 inches (46 cm) in depth.

The third filter media 312 is preferably either particulated garnet or silica having an average particulate size of approximately between 1.15 mm to 2.0 mm in diameter. Because the particulates of the third filter media 312 are larger than those of the second filter media 311 the third media particulates 312 will tend to stack vertically below the second filter media 311. The third filter media 312 preferably has a depth of between approximately 6 inches (15 cm) and 36 inches (92 cm).

The fourth filter media 313 is preferably particulated rock, the particulates having an average particulate size of approximately between 0.3 inches (0.7 cm) and 0.85 inches (2.2 cm) in diameter. The fourth filter media 313 is the bottom layer of the filter medias 310, 311, 312, 313 within the filter body 301 and preferably has a depth of between approximately 6 inches (15 cm) and 36 inches (92 cm) inside the volume 305 of the filter body 301. A septum (not shown) or other known apparatus retains the filter medias 310, 311, 312, 313 within the volume 305 and prevents the filter medias 310, 311, 312, 313 from passing through the outflow port 307 during filtration.

In a second preferred embodiment, at least one of filter medias 310, 311, 312, 313 is crushed glass. The use of crushed glass as a particulated filtration media 310, 311, 312, 313 allows filtration of smaller/finer particles from the fluid due to the configurations and edge portions of the glass particles. Use of crushed glass as the filter media allows the instant improved system for removing contaminants from fluids to remove particles down to approximately 8 microns in size.

In a still further preferred embodiment, at least one of filter medias 310, 311, 312, 313 is a filter media commercially known as IMA-65™ which is manufactured by Yardney™ Water Filtration Systems of Riverside Calif., USA. IMA-65 has a unique property of chemically reacting with contaminants such as, but not limited to, Iron (Fe), and Manganese (Mg), and Arsenic (Ar), and is effective in removing these and other contaminants from the fluid. Further, IMA-65 reduces and/or eliminates the necessity of adding potassium permanganate into the fluid stream to cause effective coagulation, precipitation and filtration. In place of the added potassium permanganate, use of IMA-65 as a filtration media 310, 311, 312, 313 allows small amounts of chlorine (Cl) to be used in place of the potassium permanganate.

The plural filter bodies 301 are interconnected to one another in parallel by known plumbing apparatus and fittings so that inflow of fluid enters the inflow ports 306 of each of the plural bodies 301 generally simultaneously and percolates through the filter medias 310, 311, 312, 313 and exits the outflow ports 307 generally simultaneously. Known plumbing connections communicating with the outflow ports 307 thereafter communicate with selector valves 330 that may be actuated to initiate backwash cleaning operations.

A variety of sensors (not shown) and gauges (not shown) communicate with the volume 305 inflow port 306 and outflow port 307 of each body 301 to monitor head pressure, flow rates and conditions within the volumes 305. Any increase in "head pressure" or decrease in flow rate is indicative of the filter medias 310, 311, 312, 313 becoming saturated or otherwise plugged with contaminants such that fluid passage therethrough is reduced. When saturation or "plugging" occurs, selector valve 230 may be manually or automatically activated which directs the fluid input from the electrocoagulator 120 and/or dwell tank 220 to flow through known plumbing connections into the parallel second particulate filter 300B to maintain continuous filtration operations. While the fluid is being filtered by the parallel second particulate filter 300B, the first particulate filter 300A may be backwashed by forcing clean water through valve 330 and through backwash in flow port 308 and through the filter medias 310, 311, 312, 313 in a reverse direction which causes the accumulated contaminants within the filter medias 310, 311, 312, 313 to flow outwardly through a backwash outflow port 309 whereupon the out flowing contaminants may be fluidically directed to the waste tank 250 for collection, storage and ultimate disposal. Depending upon the type of contaminants and/or particulates being removed it may be desirable to direct the backwash from the particulate filter 300 into the electrocoagulator 120 for further electrocoagulation of particulates in order to further save volumes of fluid.

The backwash cleaning function/operation is a conventional operation well known to those familiar in the art of fluid filtration systems and requires that the direction of fluid flow be reversed. Various known manual and automatic valves and pumps are utilized to initiate and perform the backwash function. The variety of valves isolate specific components of the system allowing the fluid flow to be reversed only through the selected components while fluid flow through the system in the "filtering direction" continues through the non-backwashing components of the system.

The continuous filtration of the coagulated fluids from the electrocoagulator 120 and/or dwell tank 220 continues uninterrupted by using the parallel second particulate filter 300B while the first particulate filter 300A is backwashed, flushed and cleaned. The process is repeated when the parallel second particulate filter 300B becomes saturated, clogged, plugged or the sensors indicate the flow rate is diminished or the "head pressure" has increased to a predetermined level. Although not shown in the accompanying Figures, it is expressly contemplated that additional parallel particulate filters 300 similar to the first particulate filter 300A and the parallel second particulate filter 300B may be plumbed in parallel into the instant improved system for removing contaminants from fluids to provide additional redundancy and contaminant removal capability. The mobile truck mounted nature of the instant invention further allows the addition of additional particulate filters 300 to be simple, efficient and customizable for geological conditions and user needs.

Known plumbing apparatus and connections communicate with the outflow ports 307 of the plural filter bodies 301 of the first particulate filter 300A and the parallel second particulate filter 300B to channel the fluid to subsequent components of the instant improved system for removing contaminants from fluids.

A valve 320 (FIG. 1) allows the fluid exiting the first particulate filter 300A and parallel second particulate filter 300B to alternatively be directed to a water mixing station 700 or through another valve 430 for directing the fluid to the step down membrane filter 400.

The step down the membrane filter 400 has two parallel filter assemblies which are referred to herein as a first step down membrane filter 400A and a parallel second step down membrane filter 400B. Fluid from the particulate filter 300 may flow through either or both the first step down membrane filter 400A, and/or through the parallel second step down membrane filter 400B by means of valve 430. Because the first step down membrane filter 400A and the second step down membrane filter 400B are similar to one another, only the first step down membrane filter 400A will be described in detail herein.

Figure 5:
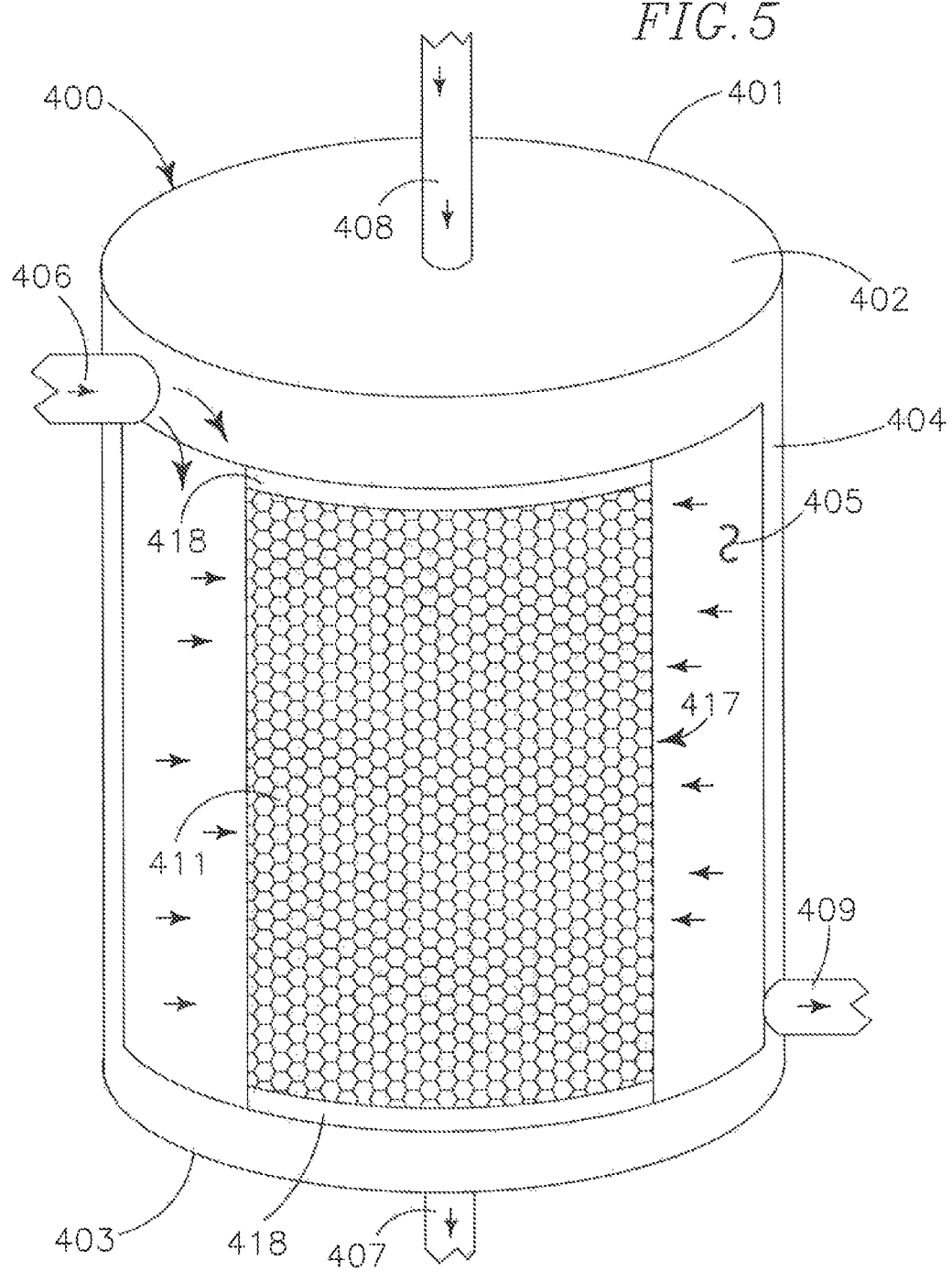
FIG. 5 is an orthographic partial cutaway side view of a step down membrane filter showing a membrane filter cartridge therein with arrows showing the direction of fluid flow therethrough.

The step down membrane filter 400 (FIG. 1) comprises plural fluidically interconnected filter bodies 401, (FIG. 5) each having a top 402, a bottom 403 and a side portion 404 extending from the top 402 to the bottom 403. Each body 301 defines an interior volume 405. In the preferred embodiment, each body 401 is an approximately sixty inch (153 cm) diameter "vertical barrel type" filter canister such as those made by Yardney®, Inc. of California USA. The plural bodies 401 are fluidically interconnected with one another by means of known plumbing apparatus and connections.

Each body 401 defines an inflow port 406 an outflow port 407, a backwash inflow port 408 and a backwash outflow port 409. All ports 406, 407, 408 and 409 communicate with the interior volume 405. An access hatch (not shown) is defined in the body 401 and provides user access to the interior volume 405 of the body 401 for maintenance, inspection, membrane filter 413 replacement and the like.

Figure 6:
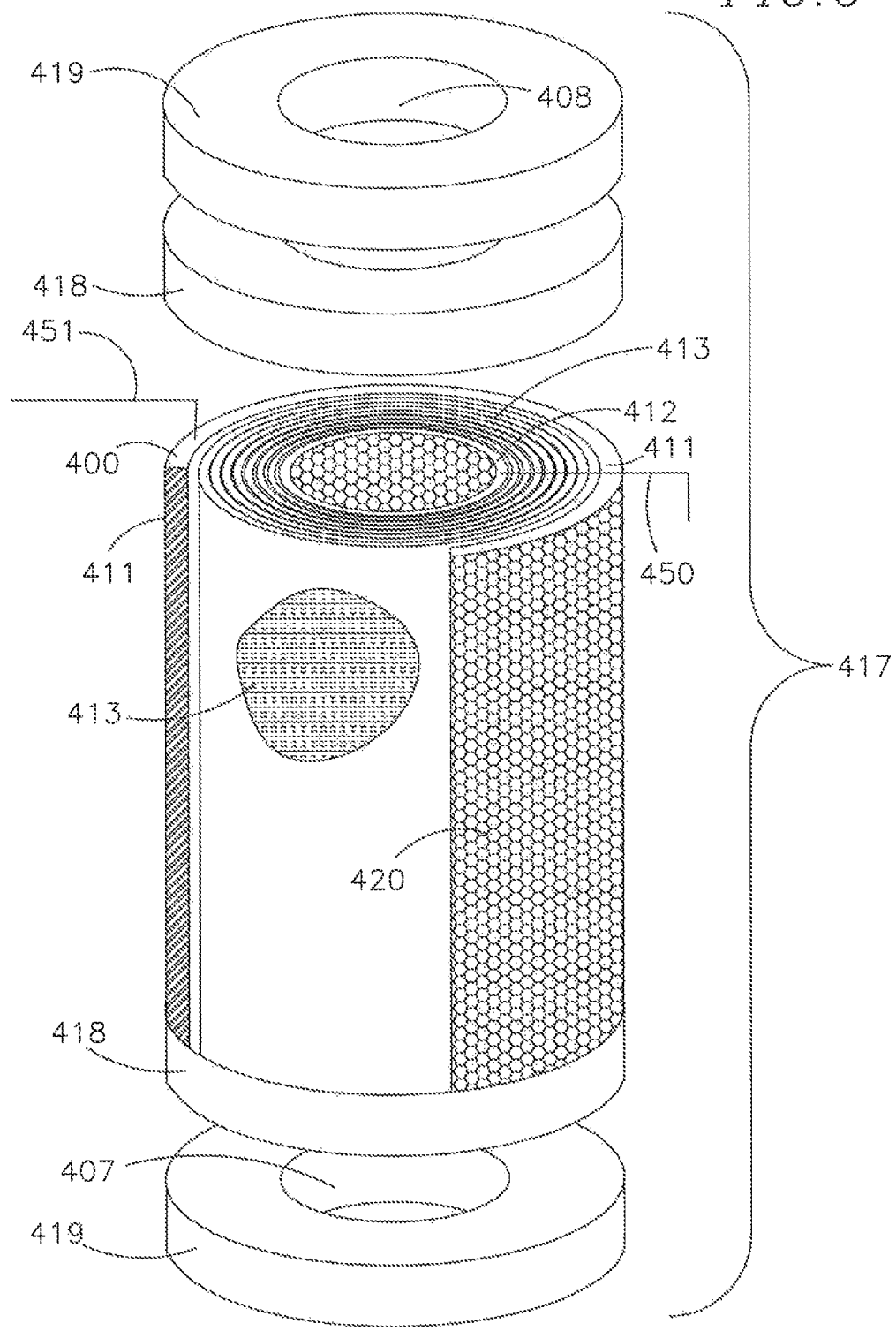
FIG. 6 is an exploded isometric top and side view of a membrane filter cartridge.
Figure 12:
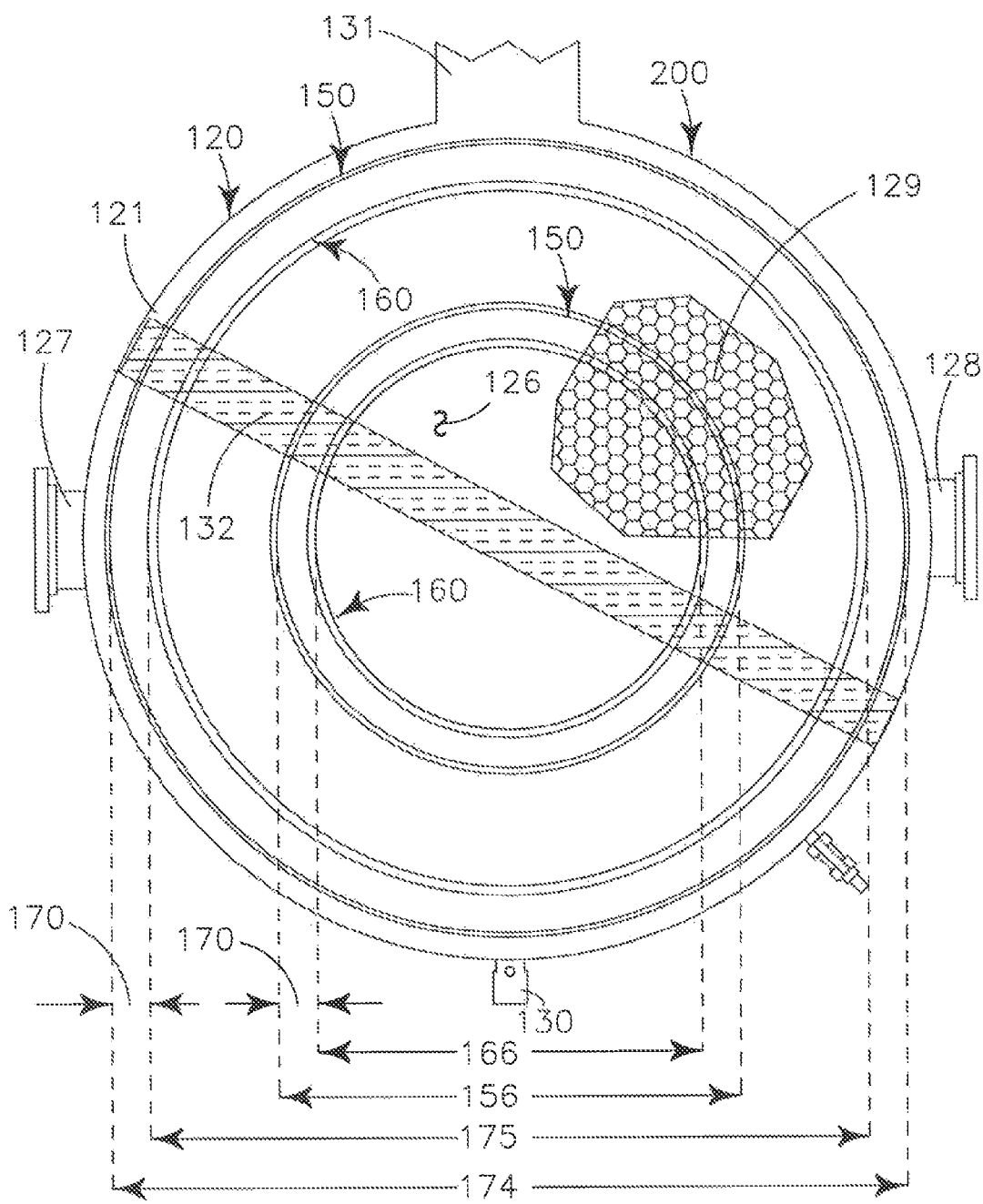
FIG. 12 is a plan view of an electrocoagulator body showing plural concentrically aligned anodes and cathodes within the electrocoagulator volume, the diffusion plate and the insulator.

A removable/replaceable membrane filter cartridge 417 is carried within the interior volume 405 of each filter body 401. Each removable/replaceable membrane filter cartridge 417 (FIG. 6) has an outer membrane cage 411 and an axially aligned diametrically smaller inner membrane cage 412. The membrane cages 411, 412 are each preferably elongate and tubular in configuration and each defines a plurality of through holes 420 therein to allow fluid to flow therethrough.

A filter membrane 413 such as, but not limited to a Poly Nitryl (Poly-Pan) low-pressure reverse osmosis membrane such as the AP Series™ of thin film reverse osmosis membranes manufactured by GE® Power & Water of Fairfield Conn. USA is wrapped circumferentially about an outer circumferential surface of the inner membrane cage 412 in a series of "wraps" to entirely cover the outer circumferential surface of the inner membrane cage 412. The number of wraps may be varied (increased/decreased) to adjust porosity, surface area, flow rate and the like to suit the contaminated fluid requirements. Thereafter, the outer membrane cage 411 is interconnected with the inner membrane cage 412 exterior of the wraps of filter membrane 413 so that the filter membrane 413 is positionally secured between the inner membrane cage 412 and the outer membrane cage 411. The plurality of through holes 420 defined in the membrane cages 411, 412 allows fluid to pass therethrough and into direct physical contact with the filter membrane 413. Septums (not shown) which may be electrically conductive may be positioned between the wraps of the filter membrane 413 causing the wraps of filter membrane 413 to be spaced apart from one another. Alternatively, if less porosity is desired a series of filter membrane 413 wraps may be positioned in direct frictional contact with one another.

The filter membrane 413 is a low-pressure membrane operating at between approximately 60 PSI and 100 PSI. This low-pressure is sufficient to cause fluid flow through the filter membrane 413 from one surface to the opposing surface. The filter membrane 413 separates contaminants from the fluids by preventing the contaminants from passing through the filter membrane 413 while allowing the fluid to pass therethrough.

The membrane filter cartridge 417 (FIG. 6) carries a sealed cap 418 at each opposing end portion that interconnects the outer membrane cage 411 to the inner membrane cage 412 with the filter membrane 413 secured therebetween.

A first electrical lead 450 is connected to the inner membrane cage 412 and a second electrical lead 451 is connected to the outer membrane cage 411. Application of an electrical current to the electrical leads 450, 451 creates a magnetic field between the two membrane cages 411, 412 which permeates through the membrane filter 413 which causes ionic molecules and charged particulates and polycoagulants to be attracted to one of the membrane cages 411, 412. In the preferred embodiment a voltage of approximately between 12 volts and 36 volts at a current of approximately between 10 amps and 25 amps is applied to the membrane cages 411, 412. If electrically conductive septums (not shown) are carried within the membrane filter cartridge 417 between the wraps of filter membrane 413, the electrical leads 450, 451 may similarly be interconnected to the septums (not shown) to generate magnetic fields and electric fields. The application of electrical current to the membrane cages 411, 412 and septums (not shown) further enhances the contaminant removal capability of the instant system by causing ionically charged particulates and/or molecules to migrate towards one of the membrane cages 411, 412. During backwashing/cleaning functions the polarity of the electrical current is reversed to "drive" the ionic molecules and/or particulates away from the filter membrane 413 and membrane cages 411, 412 and septums (not shown) to be removed during the backwash cleaning operation.

Filter connections 419 are carried by each body 401 within the volume 405 and provide a watertight connection between the sealed caps 418 and top and bottom interior portions (not shown) of the filter body 401. Bottom filter connection 419 fluidically communicates with the outflow port 407 and top filter connection 419 provides a fluid tight seal about the backwash inflow port 408. The watertight interconnection between the sealed caps 418 and the filter connections 419 forces fluid within the interior volume 405 to flow in a single direction through the membrane filter cartridge 417. As shown by direction allows in FIG. 5, fluid enters the volume 405 through the inflow port 406 and physically contacts the exterior surface of the membrane filter cartridge 417 and exterior surface of the outer membrane cage 411. The fluid tight engagement between the sealed caps 418 and the filter connections 419 prevent the fluid from communicating with the outflow port 407 without having first passed through the membrane filter cartridge 417. The fluid pressure within the bodies 401 forces the fluid through the filter membrane 413 where the particulates and contaminants are separated from the fluid by the filter membrane 413 and by the magnetic field generated by the electrical current. The porosity of the filter membrane 413 is engineered so that only fluid, but not particulates, may pass therethrough to the interior portion of the membrane filter cartridge 417 wherein the fluid may exit the body 401 through the outflow port 407.

Membrane type filters are known in the Industry, but heretofore have not been used to filter heavily contaminated fluids because membrane filters generally require high pressures to force contaminated fluid through the membrane material because only a small amount of membrane surface area is available for contaminant removal due to the high pressures required and because membranes are easily plugged, damaged and destroyed by oils, hydrocarbons and the like. Further, membrane filters have a well-recognized drawback of completely preventing fluid pass-through once a contaminant saturation point has been reached. For this reason, among others, membrane filters require tremendous amounts of maintenance and observation during use and are not well suited for heavily contaminated fluids or fluids that contain hydrocarbons that will cause saturation points to be quickly reached.

The instant invention overcomes these and other known drawbacks to membrane type filters by providing a "step down" series of membrane filters that are operated in series and by providing multiple times the amount of membrane surface area available for contaminant separation. The "step down" configuration of the instant system for separating contaminants from fluids is functional because a first step down membrane filter body 401 carries a removable and replaceable membrane filter cartridge 417 therein having a lesser number of membrane "wraps". The filter membrane 413 is relatively thin and relatively porous so that only larger particulates and larger size contaminants are removed as the fluid passes therethrough under low-pressure. A second step down membrane filter body 401 fluidically communicates in series with the first step down membrane filter body 401 by means of known plumbing connections wherein the outflow port 407 of the first step down membrane filter body 401 communicates with the inflow port 406 of the second step down membrane filter body 401. The membrane filter cartridge 417 within the second step down membrane filter body 401 has a greater number of filter membrane 413 "wraps" such that the filter membrane 413 is less porous than the filter membrane 413 in the first step down membrane filter body 401. Each body 401 communicates with a next body 401 in the series with the same fluid flow direction therethrough, namely the outflow port 407 of one body 401 communicating with the inflow port 406 of the next body 401. Similarly, the membrane filter cartridges 417 of each successive body 401 in the series of filter bodies 401 has a greater number of membrane "wraps" so that as the fluid passes successively through each body 401 and each membrane filter cartridge 417 the contaminates and particulates within the fluid are removed with the larger contaminants and particulates being removed first, and successively smaller contaminants and particulates being removed through the successive membrane filters cartridges 417. Only a portion of the particulates and contaminants are removed from the fluid in each body 401.

Through this configuration of a series "step down" the fluid may be continuously filtered, and the well-known drawback of membrane filters becoming quickly saturated is overcome because each membrane filter cartridge 417 in the series has a different porosity, and is only separating out a portion of the contaminants and particulates within the fluid. The series of membrane filters 417 configured, as described herein, has the ability to ultimately remove contaminants and particulates from the fluid down to approximately 6 microns in size.

This configuration of step-down membrane filters 400 also provides an effective means to recover finely graduated particulates from the fluid and such finely gradiated particulates may be commercialized as a useful product. For example, if the fluid passing through the instant system is fruit or vegetable juice, the fruit/vegetable pulp may be gradiated by particulate size. The step-down configuration of the instant step-down membrane filters 400 allows various sizes of pulp particulates to be separated for commercialization, as it is well recognized that particular sizes of pulp particulates are commercially desirable as food additives, while other sizes are waste products. Further, small particulates of minerals such as gold and silver which are suspended in solution from mining operations may likewise be separated from the fluid and collected.

The collection of gradiated particulates is accomplished by interconnecting the backwash outflow 409 of each body 401 separately to a collection body 435 so that the backwash outflow from each body 401 flows separately into the collection body 435. Because each body 401 may be backwashed independently from the other bodies 401, the sizes of the contaminants/particulates flowing into the collection body 435 from a particular step-down membrane filter body 401 will be only the size contaminants/particulates that are removed by the membrane filter cartridge 417 of that particular body 401.

A variety of sensors (not shown) and gauges (not shown) that sample for and measure characteristics such as, but not limited to, PH, Cl, Fe, $0^2$, Phosphates and silt density (SDI) such as those manufactured by Hawk® Measurements of Middleton, Mass., USA communicate with the volume 405 of each body 401 to monitor head pressure and flow rates within the volumes 405. An increase in "head pressure" or decrease in flow rate is indicative of the membrane filter cartridges 417 becoming saturated or otherwise plugged with contaminants such that fluid passage therethrough is reduced. When saturation or "plugging" or flow rate reductions are indicated, selector valve 430 may be activated which directs the fluid to flow through known plumbing connections into the parallel second step down membrane filter 400B to maintain continuous filtration operations. While the fluid is being filtered by the parallel second step down membrane filter 400B, the first step down membrane filter 400A may be backwashed 75 by forcing clean water through the membrane filter cartridges 417 in a reverse direction which causes the accumulated contaminants within the membrane filter cartridges 417 to flow outwardly through a backwash outflow ports 409 and into the collection body 435 by known means whereupon the contaminants, and particulates may be collected for use and/or directed to the waste tank 250 for collection, storage and ultimate disposal. During the backwash 75 process the polarity of the voltage applied to the membrane cages 411, 412 is reversed to drive charged particulates and ionic molecules into the backwash flow for removal.

As noted previously, the backwash function/operation is a conventional operation well known to those familiar in the art of fluid filtration systems. In FIG. 1 the backwash system for the step down membrane filter 400 is identified with the numeral 75 and fluid input to operate the backwash system 75 is identified with the numeral 50.

The continuous filtration of the fluid exiting the particulate filters 300 may continue in uninterrupted fashion by using the parallel second step down membrane filter 400B while the first step down membrane filter 400A is backwashed, flushed or otherwise cleaned. The process is repeated when the parallel second step down membrane filter 400B becomes saturated, clogged, plugged or the sensors indicate the flow rate is diminished or the "head pressure" increases over a predetermined level. Although not shown in the accompanying Figures, it is expressly contemplated that additional parallel step down membrane filters 400 similar to the first step down membrane filter 400A and the parallel second step down membrane filter 400B may be plumbed in parallel into the contaminant removal system to provide additional redundancy and contaminant removal capability. The mobile truck mounted nature of the instant invention further allows the addition of additional filter units to be simple and efficient and customizable for site specific conditions.

Fluid exiting the outflow ports 407 of the step down membrane filters 400 communicates with a valve 530 which directs the out flowing fluid to either the mixing station 700 or to an optional ultra filtration system 500.

The ultra filtration system 500 (FIGS. 7, 8) has a first ultra filtration manifold 500A and a parallel second ultra filtration manifold 500B. Because the first ultra filtration manifold 500A and the parallel second ultra filtration manifold 500B are similar, only the first ultra filtration manifold 500A will be described in detail herein. As shown in FIG. 7, the ultra filtration manifold 500A is configured to threadably receive plural filter cartridge bodies 502. Each of the plural filter cartridge bodies 502 carries within a medial chamber 504 defined therein, a replaceable filter cartridge 503 such as a paper filter cartridge manufactured by Mann+Hummel, Inc. of Bloomfield Hills, Mich., USA that is capable of filtering even smaller micron size particles out of fluids passing therethrough. Such filter cartridges 503 are generally not tolerant of backwash cleaning operations and are instead replaced when saturated/plugged with contaminants/particulates.

A valve 531 interconnected with outflow ports (not shown) of the ultra filtration manifolds 500A, 500B receives filtered fluid therefrom and thereafter directs the filtered fluid either to the metering station 700 or to an inflow port 603 of the optional reverse osmosis filter 600.

The optional reverse osmosis filter 600 (FIG. 9) is of known configuration, such as a reverse osmosis filter system designed and built by General Electric® Inc. (GE®). As shown in FIG. 9, the reverse osmosis filter 600 has a body 601 that defines an interior volume 602. An inflow port 603 and an outflow port 604 are defined in the body 601 and communicate with the volume 602. In one preferred embodiment, the reverse osmosis filter 600 carries a plurality of membrane filters 606 within the volume 602 that are preferably formed from a material such as, but not limited to, Polyacryl Nitryl Pan Polymer (commonly known as Poly-Pan membranes) which is known for its capability to remove dissolved salts from fluids. The reverse osmosis filter 600 has a continuous filtering volume capacity of approximately 600 GPM. However, by adjusting valve 531 the amount of fluid flowing into the reverse osmosis filter 600 may be adjusted below the maximum filtering capacity with the remaining amount of fluid from the ultra filtration manifold 500 passing directly to the mixing station 700 by known plumbing means rather than to the reverse osmosis filter 600.

The use of the plural filter systems 100, 200, 220, 300, 400, 500 upstream from the reverse osmosis filter 600 is essential to the maintenance and longevity of the reverse osmosis filter 600 which is susceptible to damage and destruction by even miniscule amounts of petroleum based contaminants, such as any hydrocarbons or oil remaining in the fluid.

After the fluid has passed through the optional reverse osmosis filter 600, the fluid exits the outflow port 604 and passes through an outflow control valve 605 used to precisely control outflow. Known plumbing apparatus and fittings interconnect the outflow control valve 605 to the water mixing station 700 at which point the wastewater outflow from the reverse osmosis filter 600 may be mixed with fluid coming from the first particulate filter 300A and/or the parallel second particulate filter 300B. Fluid mixing at the mixing station 700 allows fluid filtration to continue at a maximum rate while generating an outflow that meets or exceeds specifications, standards and regulations set forth by various governing authorities and/or users, such as but not limited to, induced hydraulic fracturing operators. For example, if the fluid outflow exiting the first particulate filter 300A and parallel second filter particulate filter 300B has minimal amounts of dissolved salt, use of the reverse osmosis filter 600 may not be necessary and therefore a large percentage of the fluid outflow may pass directly from the first particulate filter 300A and parallel second particulate filter 300B to the mixing station 700. Alternatively, if the outflow from the first particulate filter 300A and parallel second particulate filter 300B has high levels of dissolved salts, it may be necessary to direct nearly all of the fluid outflow through the ultra filtration system 500 and through the reverse osmosis filter 600 to remove the dissolved salts. If the outflow from the particulate filters 300A, 300B has high levels of dissolved solids but not dissolved salts, it may be desirable to direct the fluid outflow only to the ultra-filtration system 500 and not the optional reverse osmosis filter 600.

The mixing station 700 defines an inflow port 701 and an outflow port 702 and is fluidically interconnected with the other components of the system by known plumbing apparatus and fittings so that fluid from the particulate filters 300, from the step down membrane filters 400, from the optional ultra filtration manifolds 500A, 500B and the optional reverse osmosis filter 600 passes into the inflow port 701. The mixing station 700 has a sensor array (not shown) that allows the filtered fluid outflow from the system to be tested with various sensors, scanners, samplers and testing apparatus and, for example, allows the pH of the water to be determined and thereafter and adjusted by addition of various chemicals including buffers for controlled neutralization of acids and the like. Other characteristics that are determined and may be adjusted include, but are not limited to, Silt Density Index (SDI), Fe, Cl, $O^2$, Mg, $CO^2$, $N^2$, NO and phosphates. The mixing station 700 allows volumes of clean fluid, which may be water, to be added to the filtered and treated fluid flow to dilute any contaminant concentrations in the fluid.

Fluid exiting the mixing station 700 passes through the outflow port 702 and thereafter through known plumbing apparatus to a totalizer and sensor array 900. The totalizer and sensor array 900 defines an inflow port 905 and defines an outflow port 906. Positioned between the inflow port 905 and the outflow port 906 are various sensors (not show) and meters (not shown) and samplers (not shown) to test and measure and sample the fluid passing therethrough for components and characteristics such as, but not limited to, temperature, pH, dissolved solids, dissolved salts, mineral content, bacteria, oxygen content, nitrogen content, silt density and the like. A sensor array such as those manufactured by Hawk Measurements, Inc. is anticipated for use and provides an automated means to continually test and monitor the fluid output of the system. Information and data provided by the totalizer and sensor array 900 will allow operators to determine when and if to backwash and/or change filters and or alter chemical additives/treatments to the fluid. The totalizer and sensor array 900 provides a means to measure the quality and quantity and volume of fluid passing through the system which provides a means by which an owner of the system may bill/invoice an operator/lessee of the system on a volume basis of filtered fluid (by gallon, barrel, liter or other volume measurement) or by gallon/barrel/liter per minute whichever calculation means is agreed upon.

A volume meter 99 measures the volume of fluid flowing into the oil-water separator 100 and provides a baseline measurement against which can be compared the outflow volume determined by the totalizer and sensor array 900.

Having described the structure of the improved system for separating contaminants from fluid, its operation may be understood.

The oil-water separator 100, the electrocoagulator 120, the dwell tank 220, the waste tank 250, the particulate filter 300, the step-down membrane filter 400, the optional ultra filtration system 500, the optional reverse osmosis filter 600, the mixing station 700 and the totalizer and sensor array 900 are all mobile and preferably truck trailer mounted or skid mounted. The various components are moved to the desired location and positioned relative to one another so that fluid interconnections between the various components can be established with known plumbing apparatus. Electrical power to the system anodes 150, cathodes 160, pumps, sensors, valves and the like may be provided by a generator (not shown) or by interconnecting the system components to a battery pack (not shown) or the local electrical grid (not shown). After the various components are interconnected, a pump (not shown) is primed with the fluid to be filtered and treated and the fluid is pumped to the volume meter 99 which is the fluid entry point for the improved system.

As fluid is pumped into the improved system the fluid passes through the plumbing apparatus and connections and passes into the various volumes 102, 126, 224, 305, 405, 504, 602 defined by the various components. As the fluid flows through the interconnected components the fluid is treated and filtered and is exposed to various processes, additives, chemicals, pressures, electric fields, magnetic fields and filter membranes which remove the contaminants and/or particulates from the fluid.

A first contaminant and/or particulate removal occurs within the oil-water separator 100 which removes oils, hydrocarbons and sediment. Oil agglomerations and the like are skimmed from the fluid within the oil water separator 100 by the rotary skimmer 106. Sediment sinks to the sludge basin 104. Fluid passing out of the oil water separator 100 passes into the electrocoagulator 120 where the fluid is exposed subjected to free ions, electric fields, magnetic fields, microbubbles, oxygen and ozone to cause flocculation, agglomeration, precipitation and removal of colloids, emulsions, contaminants and particulates. Flocculent, foam and the like rising to the top of the fluid in the electrocoagulator 120 is swept off the top of the fluid by the rotating swiper blades 140 and the "swept off" flocculent is passed through the flocculent outlet 131 and thereafter transported to the waste tank 250 by known plumbing connections and apparatus. Precipitants falling to the interior bottom 123 of the electrocoagulator body 121 may be removed by known means.

Fluid flowing through the electrocoagulator 120 may be optionally directed into the dwell tank 220 if additional time is needed for precipitation, flocculation and settling of particulates to occur.

Fluid from the electrocoagulator 120, and from the dwell tank 220 after further precipitation if further precipitation is needed, passes to and through valve 230 and is directed to either the first particulate filter 300A or the parallel second particulate filter 300B for filtration through the filter medias 310, 311, 312, 313 contained within the plural filter bodies 301. If crushed glass filter media 310, 311, 312, 313 is used within the filter bodies 301 contaminants and/or particulates within the fluid having a size of approximately 8 microns are removed as the fluid passes through the filter medias 310, 311, 312, 313. Sensors, samplers, monitors and the like monitoring and testing fluid pressures, fluid flow and head pressure within the particulate filter 300A bodies 301 monitor for when the fluid pressures, head pressure and/or fluid flow reaches a predetermined level which is indicative of the filter medias 310, 311, 312, 313 becoming plugged, clogged and/or saturated with contaminants and/or particulates. Upon reaching such predetermined level, valve 230 is activated and the fluid flow from the electrocoagulator 120 is directed into the parallel second particulate filter 300B for filtration and treatment of the fluid to continue uninterrupted. While the fluid from the electrocoagulator 120 is flowing into and through the parallel second particulate filter 300B, valves 330 communicating with the first particulate filter 300A are activated allowing clean fluid, which may be water, to flow through the first particulate filter 300A in a reverse direction, known as backwashing 75, which forces accumulated contaminants, particulates and the like out of the filter medias 310, 311, 312, 313 in a reverse direction where the accumulated contaminants and/or particulates may be directed to the waste tank 250. It is anticipated the backwash 75 procedure will take approximately three minutes. When the sensors, samplers, monitors and the like detect the pressures, head pressure and volume flow in the parallel second particulate filter 300B reach the predetermined levels, valve 230 is again activated which directs the fluid flow from the electrocoagulator 120 back into the first particulate filter 300A while the parallel second particulate filter 300B is backwashed 75 to remove accumulated contaminants and particulates therein.

Fluid outflow from the particulate filter 300 passes to valve 320. If the fluid flow from the particulate filters 300 has been treated and filtered sufficiently to meet determined standards for purity and quality control, the fluid may pass through valve 320 and into the mixing station 700. If the fluid needs additional treatment and/or filtration, valve 320 will direct some portion of the fluid or perhaps all of the fluid from the particulate filter 300 to valve 430 and to the step-down membrane filter 400. Valve 430 directs the fluid flow to either the first step-down membrane filter 400A or to the parallel second step-down membrane filter 400B for filtration of the fluid through the membrane filter cartridges 417 carried in each of the bodies 401. Because each of the of the step-down membrane filter bodies 401 carry a membrane filter cartridge 417 within the volume 405 defined thereby, and because each of the membrane filter cartridges 417 in the series of step-down membrane filter bodies 401 have an increasing number of "wraps" of low pressure Poly-Pan filter membrane 413 between the metallic inner membrane cage 412 and outer metallic membrane cage 411, the porosity of the membrane filter cartridges 417 decreases as the fluid flows through each of the step-down membrane filter cartridges 417 in series. Each of the step-down membrane filter bodies 401 in the series separates only a portion of the contaminants and/or particulates from the fluid passing therethrough because each membrane filter cartridge 417 has a specific porosity that is determined by the number of "wraps" of filter membrane 413 within the membrane filter cartridge 417. Application of electrical current to the membrane cages 411, 412 also creates a magnetic field between the membrane cages 411,412 that passes through the membrane filter 413 to exert ionic forces on charged molecules and/or charged particles/contaminants within the fluid. The magnetic fields tend to "drive" the charged particles/contaminants and/or molecules toward or away from one of the membrane cages 411, 412.

Because each step-down membrane filter body 401 only separates/removes specific size contaminants and/or particulates from the fluid, the separated contaminants and/or particulates are finely gradiated by size and may be commercialized. Sensors, samplers and monitors continuously monitor, sample and test fluid pressures, fluid flow and head pressure within each step-down membrane filter body 401 for when the fluid pressures, head pressure and/or fluid flow reaches a predetermined level which is indicative of the membrane filter canisters 417 becoming plugged, clogged and/or saturated with contaminants and/or particulates. Upon such determination, valve 430 is activated and the fluid flow from the particulate filter 300 is directed into the parallel second step-down membrane filter 400B for filtration and treatment of the fluid to continue uninterrupted.

While the fluid from the particulate filter 300 is flowing into and through the parallel second step-down membrane filter 400B, valves communicating with each of the first step-down membrane filter 400A bodies 401 are activated allowing clean fluid, which may be water, to flow into and through each of the first step-down membrane filter 400A bodies 401 in a reverse direction, known as backwashing 75, which forces accumulated contaminants, particulates and the like out of the membrane filter canisters 417 in a reverse direction where the accumulated contaminants and particulates are directed into the collection body 435.

Concurrently with the backwash 75, the polarity of the electrical current applied to the membrane filter cages 411, 412 is reversed to exert ionic forces on the charged particles and/or contaminants which will assist in cleaning the membrane filter cartridges 417. Each of the step-down membrane filter bodies 401 fluidically communicates separately with the collection body 435 which receives the backwash fluids and backwashed contaminants and/or particulates during the backwash 75 operation.

It is anticipated the backwash operation 75 will take approximately three minutes and such process is not harmful or damaging to the membrane filters 413.

Gradiated and/or sized contaminants and/or particulates collected within the collection body 435 may be collected, removed and commercialized if desired. Non-useful contaminants and/or particulates may be passed to the waste tank 250 or otherwise removed for proper disposal. When the sensors, samplers and monitors detect that the second parallel step-down membrane filter 400B is becoming plugged, clogged and/or saturated valve 430 is activated and fluid flow is directed back through the first step-down membrane filter 400A while the parallel second step-down membrane filter 400B is backwashed 75 providing uninterrupted operation and filtration of the fluid and collection of the finely gradiated contaminants and/or particulates in the collection body 435.

If the fluid outflow from the step-down membrane filter 400 meets or exceeds desired standards and/or quality and/or purity measurements, the fluid outflow may be directed to the mixing station 700 by valve 530. If the desired standards and/or quality and/or purity of the fluid outflow does not meet or exceed desired standards, for example contaminants and/or particulates having a diameter down to approximately 6 microns still need to be removed, valve 530 may direct the fluid outflow to the ultra filtration system 500.

Fluid entering the first ultra filtration manifold 500A passes into and through a series of filter cartridges 503 carried within screw-on filter canisters 502 that fluidically communicate with the ultra filtration manifold 500A. Because the ultra filtration cartridges 503 are preferably formed of paper, the ultra filtration cartridges 503 are not amenable to backwashing 75 which has the tendency to damage the paper filter cartridges 503. Instead, when the sensors, samplers and monitors determine and indicate the pressures, head pressures and/or fluid flow through the ultra filtration manifold 500A reaches a predetermined level, valve 530 is activated to direct the fluid flow through the parallel second ultra filtration manifold 500B while the paper ultra filtration cartridges 503 of the first ultra filtration manifold 500A are removed and replaced. Similarly, when the sensors, samplers and monitors determine and indicate the pressures, head pressures and/or fluid flow through the ultra filtration manifold 500B reaches a predetermined level, valve 530 is activated to direct the fluid flow back through the first ultra filtration manifold 500A for continuous operation.

If the fluid outflow from the ultra filtration manifolds 500A, 500B attains or exceeds desired standards and/or quality and/or purity measurements, the fluid outflow may be directed to the mixing station 700 by valve 531. If the desired standards and/or quality and/or purity of the outflow does not meet or exceed desired standards, for example dissolved salts still need to be removed from the fluid, valve 531 may direct the fluid outflow to the reverse osmosis system 600 where the fluid is forced under high pressures, generated by fluid pumps (not shown), though a plurality of Poly-Pan filter membranes 606 where dissolved salts are removed from the fluid. Fluid exiting the reverse osmosis filter 600 passes to the mixing station 700.

Fluid entering the mixing station 700 is tested, monitored, sampled and analyzed, preferably automatically by automatic testing, sampling, analysis and measuring systems and apparatus to sample, determine and measure contaminant levels and the like to determine whether the fluid meets and/or exceeds the desired necessary standards for quality, safety, purity, and the like. If additional chemical treatment is required additional chemical additives such as pH buffers and the like may be added, automatically or manually at the mixing station 700.

Fluid exiting the mixing station 700 passes to the totalizer and sensor array 900 for final analysis, sampling, testing and measuring to determine the volume of fluid exiting the system. The volume of fluid passing through the improved system, as determined by the totalizer 900 may be compared against the volume of fluid entering the improved system as measured by the volume meter 99 to determine system efficiency and pricing for fluid treatment which may be invoiced/billed to a user/operator. Treated and clean fluid exiting the instant improved system may be stored for future use or plumbed to a destination for immediate use.

The above description has set out various features, functions, methods and other aspects of my invention. This has been done with regard to the currently preferred embodiments thereof. Time and further development may change the manner in which the various aspects are implemented.

The scope of protection accorded the inventions as defined by the Claims is not intended to be limited to the specific sizes, shapes, features or other aspects of the currently preferred embodiments shown and described. The claimed inventions may be implemented or embodied in other forms while still being within the concepts shown, described and claimed herein. Also included are equivalents of the inventions which can be made without departing from the scope of concepts properly protected hereby.

Having thusly described and disclosed an IMPROVED SYSTEM FOR SEPARATING CONTAMINATES FROM FLUIDS, I file this Continuation in Part Utility Patent Application and pray Issuance of Utility Letters Patent.

The invention claimed is:

1. A system for separating contaminants from fluids comprising in combination:
   an oil water separator fluidically communicating with a source of fluid having contaminants to be removed, the oil water separator having an oil water separator body defining an oil water separator volume for containing fluid, a fluid inlet and a fluid outflow communicating with the oil water separator volume and a sludge catch basin within the oil water separator volume;
   an electrocoagulator fluidically communicating with the oil water separator outflow to receive fluid therefrom, the electrocoagulator having,
      an electrocoagulator body defining an electrocoagulator interior volume for containing fluid and an electrocoagulator inflow port and an electrocoagulator outflow port for fluid to enter the electrocoagulator interior volume and exit the electrocoagulator interior volume,
      at least one concentrically aligned perforated tubular sacrificial anode-cathode pair carried within the electrocoagulator interior volume and electrically charged by a power source and electrically insulated from the electrocoagulator body to cause electrocoagulation of contaminants in the fluid within the electrocoagulator interior volume,
      a gas input communicating with the electrocoagulator interior volume and communicating with a diffuser plate within the electrocoagulator interior volume to disburse gas as microbubbles into the fluid within the electrocoagulator interior volume; and
      a first pump and a first valve fluidically communicating with the oil water separator fluid inlet and fluid outflow and further communicating with the electrocoagulator inflow port and outflow port to communicate fluid through the system.

2. The system for separating contaminants from fluids of claim 1 further comprising:
   a particulate filter fluidically communicating with the electrocoagulator outflow port to receive fluid therefrom, the particulate filter having,
      plural fluidically interconnected particulate filter bodies each of the plural fluidically interconnected particulate filter bodies defining a particulate filter interior volume for containing fluid and a particulate filter inflow port and a particulate filter outflow port for fluid to enter the particulate filter interior volume and exit the particulate filter interior volume,
      particulated filter media within the particulate filter interior volume of the plural fluidically interconnected particulate filter bodies to filter contaminants and particulates from the fluid as the fluid permeates through the particulated filter media,
      a backwash inflow port and a backwash outflow port each port communicating with the particulate filter interior volume for inflow of contaminant and particulate free fluid into the particulate filter interior volume of each of the plural fluidically interconnected particulate filter bodies in a direction opposite the fluid flow occurring during filtration of the fluid, and for outflow of the backwash fluid from the particulate filter interior volume of the plural fluidically interconnected particulate filter bodies to remove contaminants and particulates collected by the particulated filter media during filtration; and
      a second pump and a second valve fluidically communicating with the particulate filter backwash inflow port and backwash outflow port to communicate the backwash fluid to a waste tank and through the system.

3. The system for separating contaminants from fluids of claim 1 further comprising:
   a step-down membrane filter fluidically communicating with the electrocoagulator outflow port to receive fluid therefrom, the step-down membrane filter having,
      plural fluidically interconnected membrane filter bodies each of the plural fluidically interconnected membrane filter bodies defining a membrane filter interior volume for containing fluid and defining a membrane filter fluid inflow port and defining a membrane filter fluid outflow port for fluid to flow into the membrane filter interior volume and flow out of the membrane filter interior volume,
      a membrane filter cartridge carried within the membrane filter interior volume of each of the plural fluidically interconnected membrane filter bodies, in fluid tight communication with the membrane filter body fluid outflow port, each membrane filter cartridge having,
         a generally tubular inner membrane cage defining a plurality of spacedly arrayed holes for fluid passage therethrough and a generally tubular radially larger outer membrane cage defining a plurality of spacedly arrayed holes for fluid passage therethrough, and a filter membrane extending about an outer circumferential surface of the inner membrane cage carried between the inner membrane cage and the outer membrane cage to separate contaminants and particulates from the fluid as the fluid permeates through the filter membrane;
      a membrane filter backwash inflow port and a membrane filter backwash outflow port defined in each of the plural fluidically interconnected membrane filter bodies for inflow of contaminant and particulate free fluid into the membrane filter interior volume of each of the plural fluidically interconnected membrane filter bodies in a direction opposite the fluid flow occurring during filtration of the fluid, and for outflow of the backwash fluid from the membrane filter interior volume of the plural fluidically interconnected membrane filter bodies to remove contaminants and particulates collected by the membrane filter cartridge during filtration;
      a collection body fluidically communicating with the backwash outflow port of each of the plural fluidically interconnected membrane filter bodies to receive backwash fluid and backwash contaminants and particulates from each of the plural fluidically interconnected membrane filter bodies for separation of the backwash contaminants and particulates; and a third pump and a third valve fluidically communicating with the step down membrane filter to communicate the membrane filter backwash fluid to the collection body and to communicate fluid through the system.

4. The system for separating contaminants from fluids of claim 2 further comprising:

a step-down membrane filter fluidically communicating with the electrocoagulator outflow port to receive fluid therefrom, the step-down membrane filter having, plural fluidically interconnected membrane filter bodies each of the plural fluidically interconnected membrane filter bodies defining a membrane filter interior volume for containing fluid and defining a fluid inflow port and defining a fluid outflow port for fluid to flow into the membrane filter interior volume and flow out of the membrane filter interior volume, a membrane filter cartridge carried within the membrane filter interior volume of each of the plural fluidically interconnected membrane filter bodies, in fluid tight communication with the membrane filter body fluid outflow port, each membrane filter cartridge having, a generally tubular inner membrane cage defining a plurality of spacedly arrayed holes for fluid passage therethrough and a generally tubular radially larger outer membrane cage defining a plurality of spacedly arrayed holes for fluid passage therethrough, and a filter membrane extending about an outer circumferential surface of the inner membrane cage carried between the inner membrane cage and the outer membrane cage to separate contaminants and particulates from the fluid as the fluid permeates through the filter membrane;

a membrane filter backwash inflow port and a membrane filter backwash outflow port defined in each of the plural fluidically interconnected membrane filter bodies for inflow of contaminant and particulate free fluid into the interior volume of each of the plural fluidically interconnected membrane filter bodies in a direction opposite the fluid flow occurring during filtration of the fluid, and for outflow of the backwash fluid from the interior volume of the plural fluidically interconnected membrane filter bodies to remove contaminants and particulates collected by the membrane filter cartridge during filtration;

a collection body fluidically communicating with the backwash outflow port of each of the plural fluidically interconnected membrane filter bodies to receive backwash fluid and backwash contaminants and particulates from each of the plural fluidically interconnected membrane filter bodies for separation of the backwash contaminants and particulates; and a third pump and a third valve fluidically communicating with the step down membrane filter to communicate the membrane filter backwash fluid to the collection body and to communicate fluid through the system.

5. The system for separating contaminants from fluids of claim 1 further comprising:

a mixing station for sampling and testing fluid flowing therethrough and adding chemicals and additives to the fluid flowing therethrough causing the fluid flowing therethrough to satisfy predetermined standards for purity and safety, the mixing station having, a mixing station body defining a mixing station interior volume for fluid, a mixing station inflow port fluidically communicating with the electrocoagulator outflow port and the mixing station interior volume, and a mixing station outflow port fluidically communicating with the mixing station interior volume, a sensor array having a sampler communicating with the fluid within the mixing station interior volume to sample the fluid flowing therethrough and to measure, compile and report constituents within the fluid and to add chemicals and additives to cause the fluid to satisfy the predetermined standards for purity and safety, and a mixing station inflow port communicating with a source of contaminant and particulate free fluid for adding a quantity of contaminant and particulate free fluid to the fluid from an ultra-filtration system manifold to dilute the fluid flowing therethrough to satisfy the predetermined requirements for purity and safety.

6. The system for separating contaminants from fluids of claim 4 further comprising:

a mixing station for sampling and testing fluid flowing therethrough and adding chemicals and additives to the fluid flowing therethrough causing the fluid flowing therethrough to satisfy predetermined standards for purity and safety, the mixing station having, a mixing station body defining a mixing station interior volume for fluid, a mixing station inflow port fluidically communicating with the electrocoagulator outflow port and the mixing station interior volume, and a mixing station outflow port fluidically communicating with the mixing station interior volume, a sensor array having a sampler communicating with the fluid within the mixing station interior volume to sample the fluid flowing therethrough and to measure, compile and report constituents within the fluid and to add chemicals and additives to cause the fluid to satisfy the predetermined standards for purity and safety, and a mixing station inflow port communicating with a source of contaminant and particulate free fluid for adding a quantity of contaminant free and particulate free fluid to the fluid from the electrocoagulator to dilute the fluid flowing therethrough to satisfy the predetermined requirements for purity and safety.

7. The system for separating contaminants from fluids of claim 1 further comprising:

a totalizer for measuring quantities the fluid flowing through the system, the totalizer having, a totalizer body defining a totalizer interior volume for fluid, a totalizer inflow port fluidically communicating with the electrocoagulator outflow port and the totalizer interior volume, and a totalizer outflow port fluidically communicating with the totalizer interior volume, a sensor array having a sampler communicating with the fluid within the totalizer interior volume to sample fluid flowing therethrough and to measure, compile and report constituents within the fluid and to add chemicals and additives to cause the fluid to satisfy standards for purity and safety and to compare the quantity of fluid flowing through the totalizer with a quantity of fluid determined by a volume meter communicating with the electrocoagulator inflow port to determine the total quantity of fluid passing through the system.

8. The system for separating contaminants from fluids of claim 6 further comprising:
a totalizer for measuring quantities the fluid flowing through the system, the totalizer having,
a totalizer body defining a totalizer interior volume for fluid, a totalizer inflow port fluidically communicating with the electrocoagulator outflow port and the totalizer interior volume, and a totalizer outflow port fluidically communicating with the totalizer interior volume,
a sensor array having a sampler communicating with the fluid within the totalizer interior volume to sample fluid flowing therethrough and to measure, compile and report constituents within the fluid and to add chemicals and additives to cause the fluid to satisfy standards for purity and safety and to compare the quantity of fluid flowing through the totalizer with a quantity of fluid determined by a volume meter communicating with the electrocoagulator inflow port to determine the total quantity of fluid passing through the system.

9. A mobile modular system for separating contaminants from fluids comprising in combination:
an oil water separator fluidically communicating with a source of fluid having contaminants to be removed, the oil water separator having an oil water separator body defining an oil water separator volume for containing fluid, an oil water separator fluid inlet and an oil water separator fluid outflow communicating with the oil water separator volume and a sludge catch basin within the oil water separator volume;
an electrocoagulator fluidically communicating with the oil water separator outflow to receive fluid therefrom, the electrocoagulator having,
an electrocoagulator body defining an electrocoagulator interior volume for containing fluid and an electrocoagulator inflow port and an electrocoagulator outflow port for fluid to enter the electrocoagulator interior volume and exit the electrocoagulator interior volume,
at least one concentrically aligned perforated tubular sacrificial anode-cathode pair carried within the electrocoagulator interior volume electrically charged by a power source and electrically insulated from the electrocoagulator body to cause electrocoagulation of contaminants in the fluid within the electrocoagulator interior volume,
a gas input communicating with the electrocoagulator interior volume and communicating with a diffuser plate within the electrocoagulator interior volume to disburse gas as microbubbles into the fluid within the electrocoagulator interior volume;
a first pump and a first valve fluidically communicating with the oil water separator fluid inlet and fluid outflow and further communicating with the electrocoagulator inflow port and outflow port to communicate fluid through the system;
a particulate filter fluidically communicating with the electrocoagulator outflow port to receive fluid therefrom, the particulate filter having,
plural fluidically interconnected particulate filter bodies each of the plural fluidically interconnected particulate filter bodies defining a particulate filter interior volume for containing fluid and a particulate filter inflow port and a particulate filter outflow port for fluid to enter the particulate filter interior volume and exit the particulate filter interior volume,
particulated filter media within the particulate filter interior volume of the plural fluidically interconnected particulate filter bodies to filter contaminants and particulates from the fluid as the fluid permeates through the particulated filter media,
a backwash inflow port and a backwash outflow port each port communicating with the particulate filter interior volume for inflow of contaminant and particulate free fluid into the particulate filter interior volume of each of the plural fluidically interconnected particulate filter bodies in a direction opposite the fluid flow occurring during filtration of the fluid, and for outflow of the backwash fluid from the particulate filter interior volume of the plural fluidically interconnected particulate filter bodies to remove contaminants and particulates collected by the particulated filter media during filtration;
a second pump and a second valve fluidically communicating with the particulate filter backwash inflow port and backwash outflow port to communicate the backwash fluid to a waste tank and through the system;
a step-down membrane filter fluidically communicating with the electrocoagulator outflow port to receive fluid therefrom, the step-down membrane filter having,
plural fluidically interconnected membrane filter bodies each of the plural fluidically interconnected membrane filter bodies defining a membrane filter interior volume for containing fluid and defining a membrane filter fluid inflow port and defining a membrane filter fluid outflow port for fluid to flow into the membrane filter interior volume and flow out of the membrane filter interior volume,
a membrane filter cartridge carried within the membrane filter interior volume of each of the plural fluidically interconnected membrane filter bodies, in fluid tight communication with the membrane filter body fluid outflow port, each membrane filter cartridge having,
a generally tubular inner membrane cage defining a plurality of spacedly arrayed holes for fluid passage therethrough and a generally tubular radially larger outer membrane cage defining a plurality of spacedly arrayed holes for fluid passage therethrough, and a filter membrane extending about an outer circumferential surface of the inner membrane cage carried between the inner membrane cage and the outer membrane cage to separate contaminants and particulates from the fluid as the fluid permeates through the filter membrane;
a membrane filter backwash inflow port and a membrane filter backwash outflow port defined in each of the plural fluidically interconnected membrane filter bodies for inflow of contaminant and particulate free fluid into the membrane filter interior volume of each of the plural fluidically interconnected membrane filter bodies in a direction opposite the fluid flow occurring during filtration of the fluid, and for outflow of the backwash fluid from the membrane filter interior volume of the plural fluidically interconnected membrane filter bodies to remove contaminants and particulates collected by the membrane filter cartridge during filtration;
a collection body fluidically communicating with the backwash outflow port of each of the plural fluidically interconnected membrane filter bodies to receive backwash fluid and backwash contaminants and particulates from each of the plural fluidically interconnected membrane filter bodies for separation of the backwash contaminants and particulates;

a third pump and a third valve fluidically communicating with the step down membrane filter to communicate the membrane filter backwash fluid to the collection body and to communicate fluid through the system;

a mixing station for sampling and testing fluid flowing therethrough and adding chemicals and additives to the fluid flowing therethrough causing the fluid flowing therethrough to satisfy predetermined standards for purity and safety, the mixing station having, a mixing station body defining a mixing station interior volume for fluid, a mixing station inflow port fluidically communicating with the electrocoagulator outflow port and the mixing station interior volume, and a mixing station outflow port fluidically communicating with the mixing station interior volume, a sensor array having a sampler communicating with the fluid within the mixing station interior volume to sample the fluid flowing therethrough and to measure, compile and report constituents within the fluid and to add chemicals and additives to cause the fluid to satisfy the predetermined standards for purity and safety, and a mixing station inflow port communicating with a source of contaminant and particulate free fluid for adding a quantity of contaminant and particulate free fluid to the fluid from an ultra-filtration system manifold to dilute the fluid flowing therethrough to satisfy the predetermined requirements for purity and safety;

a totalizer for measuring quantities the fluid flowing through the system, the totalizer having, a totalizer body defining a totalizer interior volume for fluid, a totalizer inflow port fluidically communicating with the electrocoagulator outflow port and the totalizer interior volume, and a totalizer outflow port fluidically communicating with the totalizer interior volume, and a sensor array having a sampler communicating with the fluid within the totalizer interior volume to sample fluid flowing therethrough and to measure, compile and report constituents within the fluid and to add chemicals and additives to cause the fluid to satisfy standards for purity and safety and to compare the quantity of fluid flowing through the totalizer with a quantity of fluid determined by a volume meter communicating with the optimizer inflow port to determine the total quantity of fluid passing through the system.

10. The system for separating contaminants from fluids of claim 1 further comprising:

an ultra-filtration system having a filter manifold fluidically communicating with the electrocoagulator outflow port and carrying plural filter cartridge canisters each filter cartridge canister defining a filter cartridge canister medial chamber, a filter cartridge canister fluid inflow and a filter cartridge canister fluid outflow;

a replaceable filter cartridge carried within the filter cartridge canister medial chamber and oriented so that fluid must pass through the replaceable filter cartridge as the fluid passes from the filter cartridge canister fluid inflow to the filter cartridge canister fluid outflow.

11. The system for separating contaminants from fluids of claim 9 further comprising:

the ultra-filtration system manifold comprising an ultra-filtration system having a filter manifold fluidically communicating with the system and carrying plural filter cartridge canisters, each filter cartridge canister defining a filter cartridge canister medial chamber, a filter cartridge canister fluid inflow and a filter cartridge canister fluid outflow;

a replaceable filter cartridge carried within the filter cartridge canister medial chamber and oriented so that fluid must pass through the replaceable filter cartridge as the fluid passes from the filter cartridge canister fluid inflow to the filter cartridge canister fluid outflow.

12. The system for separating contaminants from fluids of claim 10 further comprising:

a reverse osmosis filter fluidically communicating with the electrocoagulator outflow port, the reverse osmosis filter having, a reverse osmosis body defining a reverse osmosis interior volume, a reverse osmosis inflow port communicating with the ultra-filtration system manifold fluid cartridge canister outflow and with the reverse osmosis body interior volume and a reverse osmosis outflow port communicating with reverse osmosis interior volume, plural spacedly arrayed reverse osmosis filter membranes within the reverse osmosis body interior volume through which fluid must pass as the fluid moves from the reverse osmosis inflow port to the reverse osmosis outflow port; and a fourth pump and a fourth valve fluidically communicating with the reverse osmosis inflow port to create fluid pressure within the reverse osmosis body interior volume to cause the fluid to permeate through the reverse osmosis filter membranes.

13. The system for separating contaminants from fluids of claim 11 further comprising:

a reverse osmosis filter fluidically communicating with the system, the reverse osmosis filter having, a reverse osmosis body defining a reverse osmosis interior volume, a reverse osmosis inflow port communicating with the ultra-filtration system manifold fluid cartridge canister outflow and with the reverse osmosis interior volume and a reverse osmosis outflow port communicating with reverse osmosis interior volume, plural spacedly arrayed reverse osmosis filter membranes within the reverse osmosis body interior volume through which fluid must pass as the fluid moves from the reverse osmosis inflow port to the reverse osmosis outflow port; and a fourth pump and a fourth valve fluidically communicating with the reverse osmosis inflow port to create fluid pressure within the reverse osmosis body interior volume to cause the fluid to permeate through the reverse osmosis filter membranes.

14. The system for separating contaminants from fluids of claim 3 wherein:

the inner membrane cage and the outer membrane cage are formed of metal;

a first electrical lead electrically communicates with the inner membrane cage and a second electrical lead electrically communicates with the outer membrane cage; and an electrical current is applied to the first and second electrical leads causing a magnetic field to form between and about the filter membrane carried between the inner membrane cage and the outer membrane cage and the magnetic field exerts ionic influences on charged contaminants and charged particulates within the fluid to enhance separation of contaminants and particulates from the fluid.

15. The system for separating contaminants from fluids of claim 4 wherein:

the inner membrane cage and the outer membrane cage are formed of metal;

a first electrical lead electrically communicates with the inner membrane cage and a second electrical lead electrically communicates with the outer membrane cage; and an electrical current is applied to the first and second electrical leads causing a magnetic field to form between and about the filter membrane carried between the inner membrane cage and the outer membrane cage and the magnetic field exerts ionic influences on charged contaminants and charged particulates within the fluid to enhance separation of contaminants and particulates from the fluid.

16. The system for separating contaminants from fluids of claim 9 further comprising:

the ultra-filtration system manifold comprising an ultra-filtration system having, a filter manifold fluidically communicating with the system and carrying plural filter cartridge canisters each filter cartridge canister defining a fluid cartridge canister medial chamber, a fluid cartridge canister fluid inflow and a fluid cartridge canister fluid outflow;

a replaceable filter cartridge carried within the fluid cartridge canister medial chamber of each filter cartridge canister and oriented so that fluid must pass through the replaceable filter cartridge as the fluid passes from the fluid cartridge canister fluid inflow to the fluid cartridge canister fluid outflow;

a reverse osmosis filter fluidically communicating with the system, the reverse osmosis filter having, a reverse osmosis body defining a reverse osmosis interior volume, a reverse osmosis inflow port communicating with the system and with the reverse osmosis interior volume and a reverse osmosis outflow port communicating with reverse osmosis interior volume, plural spacedly arrayed reverse osmosis filter membranes within the reverse osmosis interior volume through which fluid must pass as the fluid moves from the reverse osmosis inflow port to the reverse osmosis outflow port;

a fourth pump and a fourth valve fluidically communicating with the reverse osmosis filter inflow port to create fluid pressure within the reverse osmosis interior volume to cause the fluid to permeate through the plural spacedly arrayed reverse osmosis filter membranes;

a first electrical lead electrically communicating with a metal inner membrane cage of the membrane filter canister and a second electrical lead electrically communicating with a metal outer membrane cage of the membrane filter canister; and an electrical current is applied to the first and second electrical leads causing a magnetic field to form between and about the filter membrane carried between the metal inner membrane cage and the metal outer membrane cage and the magnetic field exerts ionic influences on charged contaminants and charged particulates within the fluid to enhance separation of contaminants and particulates from the fluid.

17. The system for separating contaminants from fluids of claim 1 further comprising plural perforated tubular concentrically axially aligned anode-cathode pairs within the electrocoagulator body interior volume.

18. The system for separating contaminants from fluids of claim 1 further comprising:

a lid removably attachable to the electrocoagulator body, the lid having, a powered swiper blade assembly to sweep flocculent and foam and debris rising to a top surface of the fluid within the electrocoagulator interior volume into a flocculent outlet defined in the electrocoagulator body.

19. The system for separating contaminants from fluids of claim 1 wherein space between an exterior surface of an anode and a proximate exterior surface of a cathode of an electrode pair is between six millimeters and twenty-five millimeters.

* * * * *